US012583495B2

(12) United States Patent (10) Patent No.: US 12,583,495 B2
Foley et al. (45) Date of Patent: Mar. 24, 2026

(54) WHEELBARROW STABILIZER

(71) Applicant: Tricam Industries, LLC, Eden Prairie, MN (US)

(72) Inventors: Joseph P. Foley, Mendota Heights, MN (US); Benjamin M. Wernberg, Savage, MN (US); Ryan P. Ellsworth, Chanhassen, MN (US); Benjamin P. Williams, Chaska, MN (US)

(73) Assignee: Tricam Industries, LLC, Eden Prairie, MN (US)

( * ) Notice: Subject to any disclaimer, the term of this patent is extended or adjusted under 35 U.S.C. 154(b) by 0 days.

(21) Appl. No.: 19/264,541

(22) Filed: Jul. 9, 2025

(65) Prior Publication Data

US 2025/0340231 A1 Nov. 6, 2025

Related U.S. Application Data

(63) Continuation of application No. 18/165,596, filed on Feb. 7, 2023.

(60) Provisional application No. 63/307,902, filed on Feb. 8, 2022.

(51) Int. Cl.
B62B 1/20 (2006.01)

(52) U.S. Cl.
CPC ..................................... B62B 1/20 (2013.01)

(58) Field of Classification Search
CPC .. B62B 1/20; B62B 1/206; B62B 1/18; B62B 1/00; B62B 1/202; B62B 5/06; B62B 5/067; B62B 2205/10; B62B 2301/10
See application file for complete search history.

(56) References Cited

U.S. PATENT DOCUMENTS

| | | | |
|---|---|---|---|
| 1,815,244 A | 7/1931 | Dodge | |
| 2,221,834 A | 11/1940 | Garlinghouse | |
| 3,488,091 A * | 1/1970 | Baker | B62B 1/24 |
| | | | 298/3 |
| 3,552,762 A * | 1/1971 | Garber | B62B 1/206 |
| | | | 280/47.33 |
| 4,767,128 A | 8/1988 | Terhune | |
| 4,955,625 A | 9/1990 | Herndon | |
| 4,962,833 A | 10/1990 | McCurdy | |
| 5,372,376 A | 12/1994 | Pharaoh | |
| D355,515 S | 2/1995 | Spear | |
| 5,489,000 A | 2/1996 | Hillbohm | |
| 5,564,722 A * | 10/1996 | Cimo | B62B 1/22 |
| | | | 280/47.3 |
| 5,601,298 A * | 2/1997 | Watanabe | B62B 1/22 |
| | | | 298/3 |
| 5,615,903 A | 4/1997 | Spear | |
| 5,810,375 A | 9/1998 | Hoffarth | |
| 5,876,049 A | 3/1999 | Spear | |
| 5,878,827 A | 3/1999 | Fox | |
| 5,884,924 A | 3/1999 | Fairchild | |
| 5,897,283 A | 4/1999 | Lenguyen | |

(Continued)

FOREIGN PATENT DOCUMENTS

FR 2486893 A1 1/1982

*Primary Examiner* — James M Dolak

(57) ABSTRACT

A stabilizer structure for a wheelbarrow is disclosed. The wheelbarrow stabilizer provides better stability to the wheelbarrow as well as includes a more comfortable grip that allows for easier lifting, tilting, and dumping of the wheelbarrow. The wheelbarrow stabilizer further includes geometry and manufacturing to improve its strength and durability.

20 Claims, 36 Drawing Sheets

(56) References Cited

U.S. PATENT DOCUMENTS

| | | | |
|---|---|---|---|
| 5,908,202 A | 6/1999 | Leger | |
| 5,957,352 A | 9/1999 | Gares | |
| 6,022,032 A | 2/2000 | Savage | |
| 6,053,515 A | 4/2000 | Kelley | |
| 6,065,555 A | 5/2000 | Yuki | |
| 6,099,025 A | 8/2000 | Rohrs | |
| 6,125,512 A | 10/2000 | Weber | |
| 6,148,963 A | 11/2000 | Canfield, Jr. | |
| 6,182,529 B1 | 2/2001 | White | |
| 6,193,247 B1 | 2/2001 | Spear | |
| 6,193,265 B1 | 2/2001 | Yemini | |
| 6,203,033 B1 | 3/2001 | Knoll | |
| 6,213,482 B1 | 4/2001 | Yemini | |
| 6,213,532 B1 | 4/2001 | Dunyon | |
| 6,220,622 B1 | 4/2001 | Garcia | |
| 6,241,276 B1 | 6/2001 | Wilburn | |
| 6,286,631 B1 | 9/2001 | Kimble | |
| 6,328,331 B1 | 12/2001 | McEnteggart | |
| 6,336,254 B1 | 1/2002 | Graff | |
| 6,390,496 B1 | 5/2002 | Eicher | |
| D459,564 S | 6/2002 | Daniels | |
| 6,443,267 B1 | 9/2002 | Burbank | |
| 6,446,989 B1 | 9/2002 | Intengan | |
| 6,470,981 B1 | 10/2002 | Sueshige | |
| 6,488,130 B1 | 12/2002 | Bermel | |
| 6,508,478 B1 | 1/2003 | Ortez | |
| 6,547,309 B1 | 4/2003 | Franklin | |
| 6,550,104 B2 | 4/2003 | Cacciacarne | |
| 6,554,301 B2 | 4/2003 | Scott | |
| D487,833 S | 3/2004 | Parker | |
| 6,745,859 B2 | 6/2004 | Simons | |
| 6,755,478 B2 | 6/2004 | Messinger-Rapport | |
| 6,764,093 B2 | 7/2004 | Allsop | |
| 6,766,997 B2 | 7/2004 | Stewart, III | |
| 6,820,880 B2 | 11/2004 | Benton | |
| D501,974 S | 2/2005 | Lawson | |
| 6,851,701 B2 | 2/2005 | Tomchak | |
| 6,869,098 B2 | 3/2005 | Tomchak | |
| 6,880,852 B2 | 4/2005 | Lim | |
| 6,886,838 B1 | 5/2005 | Zimmerman | |
| 6,908,088 B2 | 6/2005 | Feick | |
| 6,908,089 B1 | 6/2005 | Stark | |
| 6,923,469 B2 | 8/2005 | Tomchak | |
| 6,945,545 B2 | 9/2005 | Celli | |
| 6,983,827 B2 | 1/2006 | Swift | |
| 6,991,251 B2 | 1/2006 | Tomchak | |
| 7,000,929 B1 * | 2/2006 | Liu | B62B 1/20 |
| | | | 280/47.31 |
| 7,032,718 B1 | 4/2006 | Lessard | |
| 7,104,565 B1 | 9/2006 | Albert | |
| D530,879 S | 10/2006 | Iturbide Jimenez | |
| 7,121,565 B2 | 10/2006 | Lulay | |
| 7,134,675 B2 | 11/2006 | Carosi | |
| 7,134,676 B2 | 11/2006 | Capers, Jr. | |
| 7,144,019 B2 | 12/2006 | Lee | |
| 7,147,234 B2 | 12/2006 | Davis | |
| 7,168,712 B2 | 1/2007 | Celli | |
| D544,173 S | 6/2007 | Mullen | |
| 7,226,072 B2 | 6/2007 | Shapiro | |
| 7,232,135 B2 | 6/2007 | Robinson | |
| 7,234,710 B2 | 6/2007 | Benton | |
| 7,243,939 B2 | 7/2007 | Lowe | |
| 7,296,807 B2 | 11/2007 | Zimmerman | |
| 7,316,413 B2 | 1/2008 | Beaudoin | |
| 7,331,587 B1 | 2/2008 | Hyp | |
| 7,334,803 B2 | 2/2008 | Gonzalez | |
| 7,354,059 B2 | 4/2008 | Black | |
| 7,396,027 B1 | 7/2008 | Lovmark | |
| 7,398,980 B2 | 7/2008 | Capers, Jr. | |
| 7,427,080 B2 | 9/2008 | Naude, Jr. | |
| 7,434,818 B1 | 10/2008 | Sepeck, III | |
| 7,481,446 B2 | 1/2009 | Lowe | |
| D588,323 S * | 3/2009 | Zimmerman | D34/27 |
| D590,566 S | 4/2009 | Arcati | |
| D595,470 S | 6/2009 | Albert | |
| 7,540,521 B2 | 6/2009 | Ragusa | |
| 7,547,026 B2 | 6/2009 | Morris | |
| 7,562,898 B2 | 7/2009 | Hand | |
| 7,641,204 B2 | 1/2010 | Rye | |
| 7,658,390 B2 | 2/2010 | Martin | |
| 7,748,723 B2 * | 7/2010 | Iturbide | B62B 5/00 |
| | | | 280/47.32 |
| D621,670 S | 8/2010 | Jusidman Rubinstein | |
| 7,775,306 B1 | 8/2010 | Adkins | |
| 7,775,531 B2 | 8/2010 | Zimmerman | |
| D625,571 S | 10/2010 | Frenkel | |
| 7,815,215 B1 | 10/2010 | Lowe | |
| 7,845,654 B2 | 12/2010 | Price, Jr. | |
| 7,850,176 B2 | 12/2010 | Hill | |
| 7,866,686 B2 | 1/2011 | Conaway | |
| 7,900,939 B2 | 3/2011 | Robinson | |
| D638,192 S | 5/2011 | Hatcher | |
| 7,934,727 B1 | 5/2011 | Parry | |
| 7,934,728 B2 | 5/2011 | Strobel | |
| 7,950,687 B2 | 5/2011 | Ludlow | |
| 7,988,181 B2 | 8/2011 | Hand | |
| D646,042 S | 9/2011 | Hatcher | |
| D649,321 S | 11/2011 | Hatcher | |
| D650,250 S | 12/2011 | Frenkel | |
| D654,650 S | 2/2012 | Albert | |
| D654,651 S | 2/2012 | Albert | |
| D654,652 S | 2/2012 | Hatcher | |
| D656,378 S | 3/2012 | Islas | |
| D656,379 S | 3/2012 | Islas | |
| D658,961 S | 5/2012 | Islas | |
| D659,934 S | 5/2012 | Hatcher | |
| D660,123 S | 5/2012 | Islas | |
| D661,452 S | 6/2012 | Albert | |
| 8,231,132 B2 | 7/2012 | Dilorenzo, Sr. | |
| 8,235,153 B2 | 8/2012 | Robinson | |
| D672,628 S | 12/2012 | Frenkel | |
| D673,017 S | 12/2012 | Jusidman-Rubinstein | |
| D679,473 S | 4/2013 | Frenkel | |
| D679,882 S | 4/2013 | Frenkel | |
| 8,444,166 B1 | 5/2013 | Jarvis | |
| 8,465,103 B2 | 6/2013 | Burt | |
| 8,474,855 B2 | 7/2013 | Kilen | |
| D688,020 S | 8/2013 | Workman | |
| D688,110 S | 8/2013 | Frenkel | |
| D688,540 S | 8/2013 | Sheinberg Frenkel | |
| D688,541 S | 8/2013 | Frenkel | |
| 8,517,402 B2 | 8/2013 | Davis | |
| 8,523,198 B2 * | 9/2013 | Albert | B62B 1/18 |
| | | | 280/43.24 |
| 8,534,682 B2 | 9/2013 | Volin | |
| 8,567,797 B2 | 10/2013 | Westphal | |
| D694,981 S | 12/2013 | Albert | |
| 8,608,189 B2 | 12/2013 | Jones | |
| 8,636,289 B2 | 1/2014 | Skijus | |
| 8,668,210 B2 | 3/2014 | Stevens | |
| 8,684,374 B2 | 4/2014 | Skijus | |
| 8,733,766 B2 | 5/2014 | Nieman | |
| D706,594 S | 6/2014 | Workman | |
| 8,752,847 B2 | 6/2014 | Albert | |
| 8,783,710 B1 | 7/2014 | Kraft | |
| 8,851,215 B2 | 10/2014 | Goto | |
| 8,851,486 B2 | 10/2014 | Albert | |
| 8,857,826 B2 * | 10/2014 | Frenkel | B62B 5/00 |
| | | | 280/47.32 |
| 8,869,922 B1 | 10/2014 | Isola | |
| 8,950,758 B2 * | 2/2015 | Bysiewicz | B62B 19/00 |
| | | | 280/845 |
| 8,985,619 B2 | 3/2015 | Celli | |
| 8,985,620 B2 | 3/2015 | Erikson | |
| 8,997,658 B2 | 4/2015 | Pipkorn | |
| 8,997,903 B2 | 4/2015 | Vandelinde | |
| 8,998,221 B1 * | 4/2015 | Frenkel | B62B 1/18 |
| | | | 280/47.33 |
| 9,067,610 B2 | 6/2015 | Lichtenberg | |
| 9,067,616 B1 | 6/2015 | Tabrizi | |
| 9,090,273 B2 * | 7/2015 | Albert | B62B 1/18 |
| 9,108,690 B2 | 8/2015 | Rowlands | |
| 9,120,499 B2 | 9/2015 | Michel, Jr. | |
| 9,156,487 B1 | 10/2015 | Blume | |

(56)  References Cited

U.S. PATENT DOCUMENTS

| | | | |
|---|---|---|---|
| 9,174,658 B2 | 11/2015 | Higgins | |
| 9,216,796 B2 | 12/2015 | Kartalopoulos | |
| 9,248,850 B1 | 2/2016 | Romas | |
| 9,295,321 B2 | 3/2016 | Herbault | |
| 9,295,322 B2 | 3/2016 | Herbault | |
| 9,296,404 B1 | 3/2016 | Bell | |
| 9,327,747 B2 | 5/2016 | Jarvis | |
| 9,340,937 B2 | 5/2016 | Celli | |
| D763,535 S | 8/2016 | Workman et al. | |
| 9,415,785 B2 | 8/2016 | Cooke | |
| 9,457,823 B2 | 10/2016 | Higbe | |
| 9,463,730 B2 | 10/2016 | Romas | |
| 9,511,788 B1 | 12/2016 | Kruppa | |
| 9,663,131 B1 * | 5/2017 | Lunt | B62B 1/208 |
| 10,046,782 B2 * | 8/2018 | Dechant | B60P 1/283 |
| 11,027,760 B1 * | 6/2021 | Day | B62B 1/206 |
| 11,285,982 B2 * | 3/2022 | Van Zandt | B62B 1/24 |
| 11,970,197 B2 * | 4/2024 | Van Zandt | B62B 1/22 |
| 2001/0045718 A1 | 11/2001 | Boirum | |
| 2002/0005619 A1 | 1/2002 | Cote | |
| 2002/0084119 A1 | 7/2002 | Brabetz | |
| 2002/0113388 A1 | 8/2002 | Robinson | |
| 2002/0113389 A1 | 8/2002 | Robinson | |
| 2002/0195783 A1 | 12/2002 | Robinson | |
| 2003/0006570 A1 | 1/2003 | Baker | |
| 2003/0015852 A1 | 1/2003 | Swift | |
| 2003/0024074 A1 | 2/2003 | Hartman | |
| 2003/0084522 A1 | 5/2003 | Daniels | |
| 2003/0141686 A1 | 7/2003 | Willis | |
| 2003/0178801 A1 | 9/2003 | Hart | |
| 2003/0218305 A1 | 11/2003 | Nicolay | |
| 2004/0025623 A1 | 2/2004 | Dunbar | |
| 2004/0135333 A1 | 7/2004 | Feick | |
| 2004/0164509 A1 | 8/2004 | Campbell | |
| 2004/0201189 A1 | 10/2004 | Morse | |
| 2004/0222604 A1 | 11/2004 | Capers | |
| 2004/0227314 A1 | 11/2004 | Black | |
| 2005/0012285 A1 | 1/2005 | Davis | |
| 2005/0029761 A1 | 2/2005 | Carosi | |
| 2005/0087958 A1 | 4/2005 | Tomchak | |
| 2005/0127626 A1 | 6/2005 | Haemmerlin | |
| 2005/0134012 A1 | 6/2005 | Kan | |
| 2005/0161287 A1 | 7/2005 | Hosp | |
| 2005/0211740 A1 | 9/2005 | Sekulic | |
| 2005/0212237 A1 | 9/2005 | Lin | |
| 2005/0212238 A1 | 9/2005 | Conley | |
| 2005/0258007 A1 | 11/2005 | Albert | |
| 2005/0275174 A1 | 12/2005 | Mullen | |
| 2005/0275176 A1 | 12/2005 | Jessop | |
| 2005/0280226 A1 | 12/2005 | Celli | |
| 2005/0280227 A1 | 12/2005 | Murphy | |
| 2006/0006726 A1 | 1/2006 | Garvey | |
| 2006/0033311 A1 | 2/2006 | Lim | |
| 2006/0103088 A1 | 5/2006 | Robinson | |
| 2006/0261577 A1 | 11/2006 | Jones | |
| 2007/0007738 A1 | 1/2007 | Albert | |
| 2007/0052187 A1 | 3/2007 | Browder | |
| 2007/0079998 A1 | 4/2007 | Walter | |
| 2007/0079999 A1 | 4/2007 | Lamanna | |
| 2007/0090617 A1 | 4/2007 | Lin | |
| 2007/0096414 A1 | 5/2007 | Beaudoin | |
| 2007/0114765 A1 | 5/2007 | Leger | |
| 2007/0158922 A1 | 7/2007 | Mullen | |
| 2007/0194544 A1 | 8/2007 | Price | |
| 2007/0257456 A1 | 11/2007 | Feick | |
| 2007/0296166 A1 | 12/2007 | Robinson | |
| 2008/0067767 A1 | 3/2008 | Zimmerman | |
| 2008/0164668 A1 | 7/2008 | Feick | |
| 2008/0185803 A1 | 8/2008 | Analbers | |
| 2008/0238034 A1 | 10/2008 | Ragusa | |
| 2008/0265537 A1 | 10/2008 | Lin | |
| 2009/0058047 A1 | 3/2009 | Brosh | |
| 2009/0115163 A1 | 5/2009 | Winter | |
| 2009/0200773 A1 | 8/2009 | Riddiford | |
| 2009/0212517 A1 | 8/2009 | Stark | |
| 2009/0224509 A1 | 9/2009 | Ragusa | |
| 2009/0243242 A1 | 10/2009 | Houston | |
| 2010/0013182 A1 | 1/2010 | Kergosien | |
| 2010/0109269 A1 | 5/2010 | Albert | |
| 2010/0116960 A1 | 5/2010 | Lusk | |
| 2010/0194066 A1 | 8/2010 | Martin | |
| 2010/0201091 A1 | 8/2010 | Easterling | |
| 2011/0057402 A1 | 3/2011 | Jewell | |
| 2011/0101635 A1 | 5/2011 | Sepeck, III | |
| 2011/0221147 A1 | 9/2011 | Hatcher | |
| 2011/0291371 A1 | 12/2011 | Harris | |
| 2011/0303314 A1 | 12/2011 | Blaszczak | |
| 2012/0001403 A1 | 1/2012 | Wydner | |
| 2012/0049473 A1 | 3/2012 | Robinson | |
| 2012/0091674 A1 | 4/2012 | Kartalopoulos | |
| 2012/0126502 A1 | 5/2012 | Robinson | |
| 2012/0248721 A1 | 10/2012 | Dean | |
| 2012/0256383 A1 | 10/2012 | Hatcher | |
| 2012/0286561 A1 | 11/2012 | Frenkel | |
| 2013/0285341 A1 | 10/2013 | Erikson | |
| 2014/0151971 A1 | 6/2014 | Workman | |
| 2014/0367934 A1 | 12/2014 | Ludlow | |
| 2015/0001267 A1 | 1/2015 | Thorsen | |
| 2015/0021368 A1 | 1/2015 | Nilsen | |
| 2015/0210305 A1 | 7/2015 | Scholin | |
| 2015/0284017 A1 | 10/2015 | Nilsen | |
| 2015/0291078 A1 | 10/2015 | Carrillo, Jr. | |
| 2015/0314797 A1 | 11/2015 | Hergert | |
| 2015/0321685 A1 | 11/2015 | Smoot | |
| 2015/0329131 A1 | 11/2015 | Dumas | |
| 2016/0009305 A1 | 1/2016 | Milo | |
| 2016/0137214 A1 | 5/2016 | Mkhize | |
| 2016/0280112 A1 | 9/2016 | Jarvis | |
| 2016/0347342 A1 | 12/2016 | McCaldon | |
| 2017/0057079 A1 | 3/2017 | Thorsen | |
| 2017/0072976 A1 | 3/2017 | Dechant | |

* cited by examiner

220

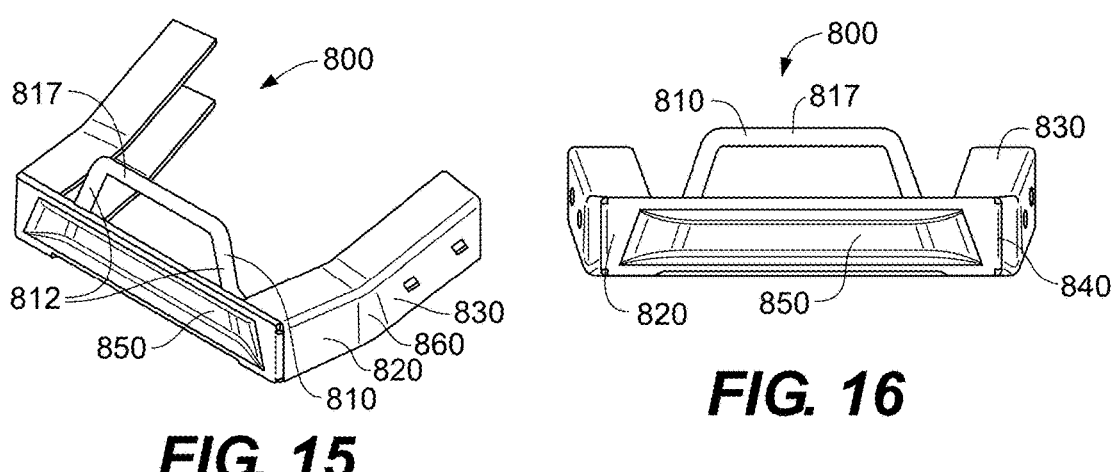
FIG. 15
FIG. 16
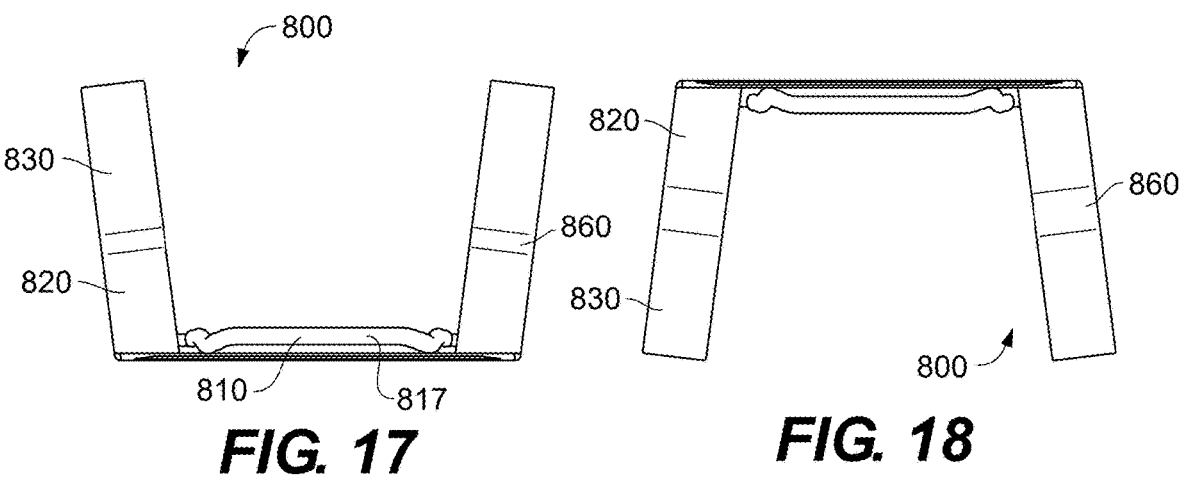
FIG. 17
FIG. 18
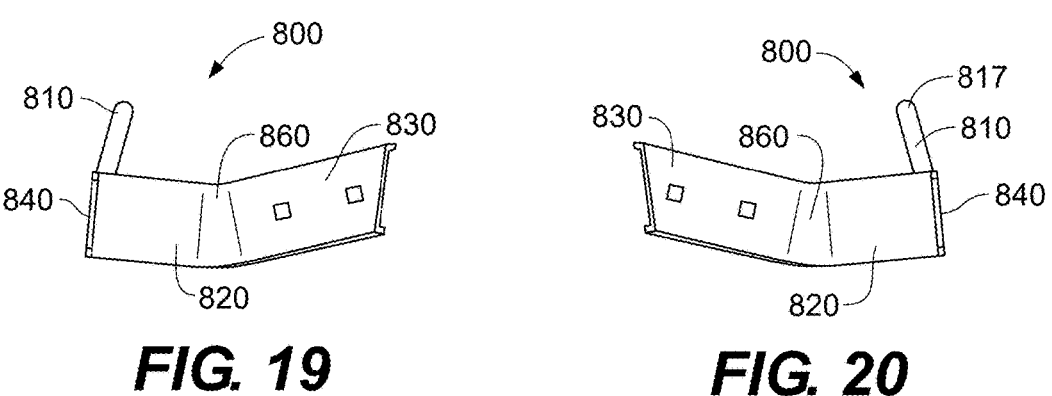
FIG. 19
FIG. 20

WHEELBARROW STABILIZER

CROSS-REFERENCE TO RELATED APPLICATIONS

The present application claims the benefit of U.S. patent application Ser. No. 18/165,596 entitled "WHEELBAR-ROW," filed Feb. 7, 2023, which claims the benefit of U.S. Provisional Application No. 63/307,902 entitled "WHEEL-BARROW," filed on Feb. 8, 2022, both of which are incorporated herein by reference in its entirety.

FIELD OF THE INVENTION

The present disclosure relates generally to portable wheel-barrows and more particularly to improvements to the size, arrangement, and orientation of components to enhance stability, clearance, and handling of a wheelbarrow.

BACKGROUND OF THE INVENTION

The modern wheelbarrow is believed to have been invented in China as early as 100 B.C. As is well known, a wheelbarrow has a tub, a frame, and at least one wheel. The frame includes a plurality of rigid frame members, with the wheel typically disposed at the front of the tub, and a pair of handles extending behind the tub. Two elongated frame members typically form a yoke to support the wheel and the backwardly extending handles. The frame members further include at least one, and typically two, legs structured to engage the ground when the wheelbarrow is resting. The legs may be generally straight posts, or, more typically, are generally U-shaped members having two tines connected by a bight. The bight is the part of the leg that engages ground. The tines extend upwardly and are coupled to the elongated frame members forming the yoke and handles. The tines and the bight are, typically, elongated and straight. That is, the legs are substantially U-shaped, but the bight is not curved except at the ends where a transition portion curves into the tines. The bight is structured to extend generally parallel to the ground. For purposes of the present disclosure, the ground surface is to be considered flat and horizontal unless described otherwise. Thus, the bight of each leg extends generally horizontally. In this orientation, substantially the entire lower surface of the bight engages the ground. The two handles allow the wheelbarrow's legs to be raised from the ground in order to change from the stationary position to the mobile position. In the mobile position, only the wheel is in contact with the ground surface, whilst the operator's legs transfer the balance of the vertical load down and away.

There are a number of drawbacks associated with conventional wheelbarrows. The single wheel facilitates the manual handling of the load, but the materials carried in the container frequently shift position therein and the balance of the wheelbarrow shifts, making control of the wheelbarrow quite difficult. Consequently, operation of the normal presently available wheelbarrow by a person of relatively small stature may be extremely difficult, and indeed, even relatively large and powerful persons may encounter difficulties in manipulation of a heavily loaded wheelbarrow. To lift a loaded wheelbarrow, a substantial lifting force is required that depends on the actual load, the position of the center of gravity with respect to distance between the center of gravity and the wheel axle, and on the distance between the handles and the wheel axle, as they are defined by established equations of a lever. Further, the orientation of known wheelbarrows includes drawbacks such as interference with a user's feet while moving the wheelbarrow and actually lifting the wheelbarrow (to overcome obstacles). The present disclosure addresses these concerns.

SUMMARY OF THE INVENTION

The disclosed invention provides a wheelbarrow that overcomes the above-cited shortcomings of prior-art wheelbarrows. The example embodiments described hereafter relate generally to improvements in wheelbarrows and more particularly, but not by way of limitation, to a wheelbarrow in which the structural shape of the frame and/or positioning of the wheel thereof provide a wheelbarrow which distributes load favorably from the user to the wheelbarrow, thus reducing the lifting force required. Another embodiment is a wheelbarrow including improvements to stabilizer legs with an orientation that allows better use foot clearance and stability as well as grips for a use to more comfortably manipulate the wheelbarrow.

Yet another embodiment of the improved wheelbarrow includes an axle system that allows for quick change from a single to a double wheel arrangement. Other embodiments include the use of retaining tabs integrated into plastic risers and handles as well as square head bolts configured for square recesses in the wheelbarrow for ease of assembly. The square head bolts and recesses allow for a flush arrangement inside the tub, which also improves use of the wheelbarrow by eliminating catch points for carried material or user tools (e.g., shovels).

A further embodiment also incorporates a handle into the wheelguard to allow for easier lifting of the front of wheelbarrow. Improvements in other embodiments include handle grips that utilize pop rivets on the bottom of the handles to better retain the handle on the wheelbarrow handles and a stepped top lip design that allows for better distribution of carried materials.

The wheelbarrow and improvements thereto described herein can be manufactured of any formable, rigid, durable material such as metal, plastic, or fiberglass as well as wood and rubber. For example, in one embodiment, the tub of the wheelbarrow can be formed of a high-density polyethylene using vacuum or thermoforming to allow custom molding of the shape. However, any material known in the art can be used (e.g., steel). The handles, braces, axles and wheel rims are preferably made of reinforced steel to provide strength and durability but can also be made of other materials such as wood. These parts can be formed, punched, cut, or otherwise shaped to the necessary specifications. Plastic may also be used for other parts such as handle and stabilizer grips or tub risers. The preferred means of connecting the various parts is using metal connectors such as steel nuts, bolts, and pop rivets, but any other material known in the art can also be used or even welding parts together is a viable option.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 15 is a top perspective view depicting a wheel guard of the wheelbarrow of FIG. 1.

FIG. 16 is a front elevation view depicting a wheel guard of the wheelbarrow of FIG. 1.

FIG. 17 is a top view depicting a wheel guard of the wheelbarrow of FIG. 1.

FIG. 18 is a bottom view depicting a wheel guard of the wheelbarrow of FIG. 1.

FIG. 19 is a right-side elevation view depicting the wheel guard of the wheelbarrow of FIG. 1.

FIG. 20 is a left side elevation view depicting the wheel guard of the wheelbarrow of FIG. 1.

Figure 1:
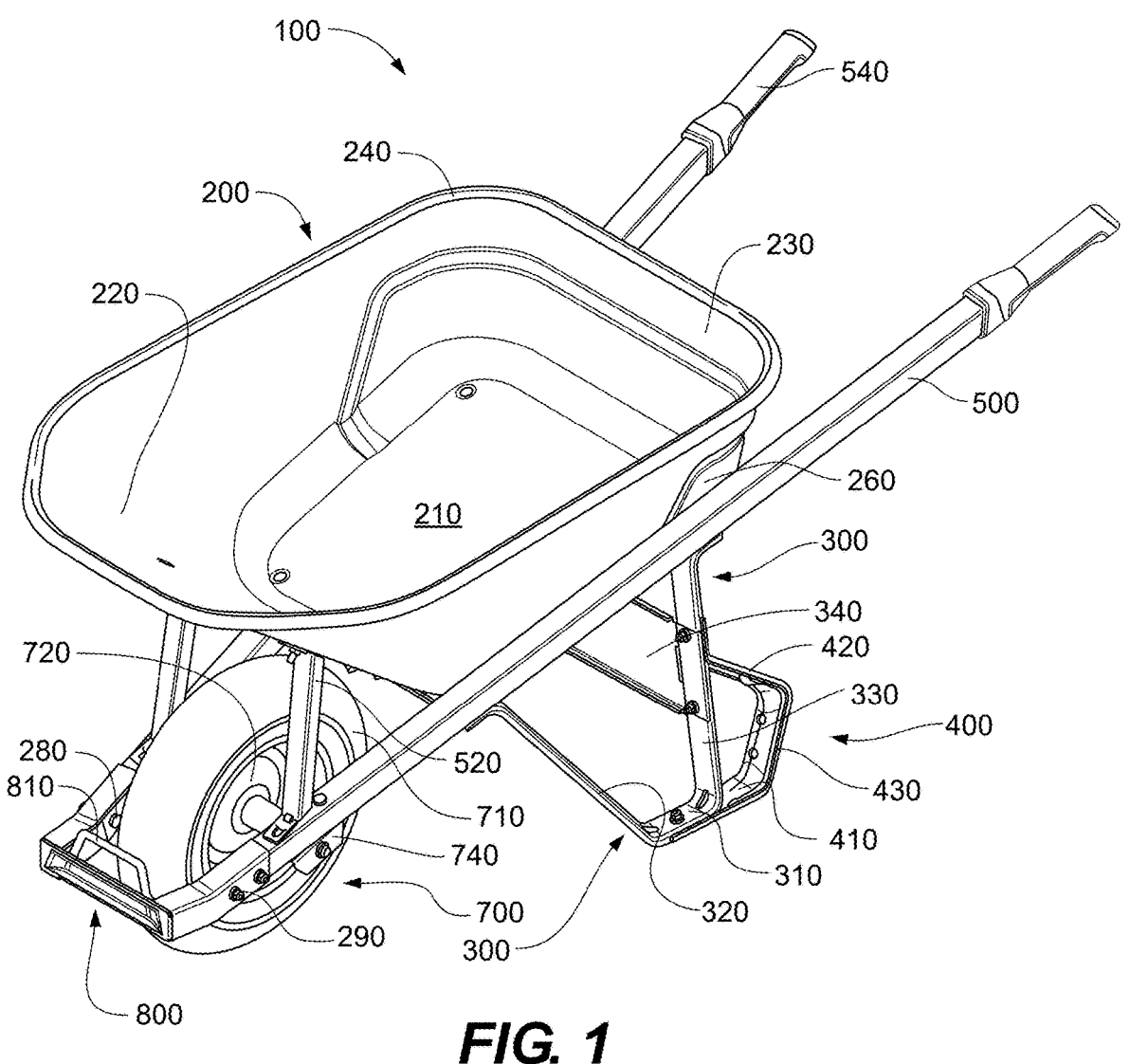
FIG. 1 is a top front perspective view depicting a wheelbarrow in accordance with an embodiment of the disclosure.
Figure 2:
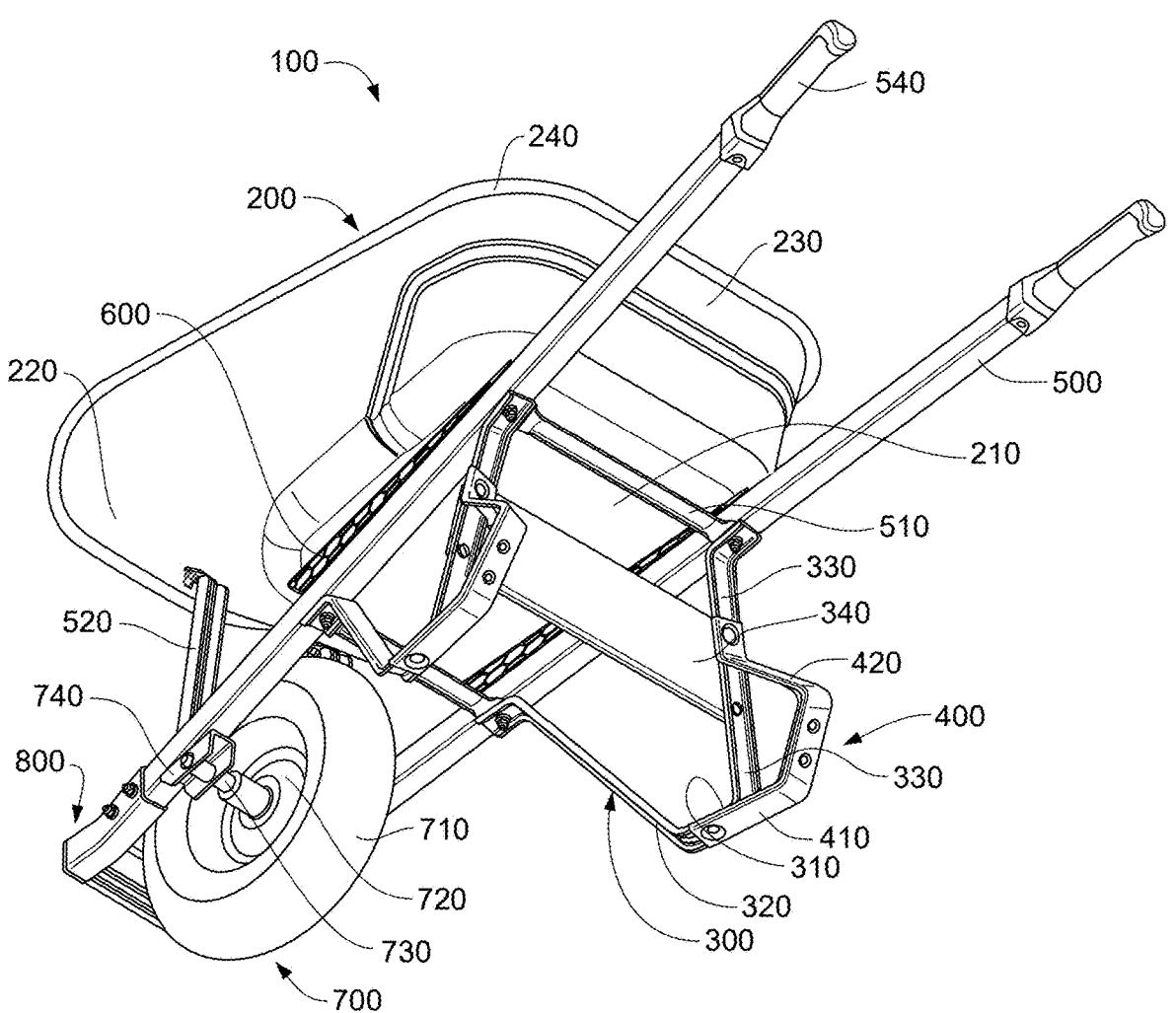
FIG. 2 is a bottom rear perspective view depicting the wheelbarrow of FIG. 1.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIGS. 1-8, a wheelbarrow 100 is depicted in accordance with an embodiment of the disclosure. The wheelbarrow 100 includes a tub 200, at least one wheel 700, at least one leg 300, and at least one handle shaft 500. The tub 200 is configured to carry loads and to maintain loads within the wheelbarrow 100. The combination of legs 300, wheels, 700, and handle shaft 500 act to support the tub 200 when the wheelbarrow is in the standing position, while being moved, and during dumping of loads from the wheelbarrow.

The preferred embodiment of the wheelbarrow 100 includes two handle shafts 500 that support the tub 200 and are, in turn, supported by two legs 300. The legs 300, in combination with stabilizers 400 and wheel 700, act as three legs to support a load within the tub 200 when the legs 300 and wheel 700 are in contact with the ground. The two handle tubes 500 are joined at the front of the wheelbarrow by a wheel guard 800. In addition to acting as a connecting structure for the two handle shafts 500, the wheel guard 800 also acts a pivot point for when the wheelbarrow 100 is in the full dump position (see FIG. 79d) and acts as a shield to protect the wheel 700 during movement of the wheelbarrow 100. Additional support between the two handle shafts 500 is provided by handle braces 510 that run between the undersides of the handle shafts 500.

As best seen in FIGS. 15-20 and 69-74, the wheel guard 800 may be of any shape necessary to connect the handle shafts 500 and to protect the wheel 700 of the wheelbarrow 100. However, the preferred embodiment contemplates a wheel guard 800 that has a flat front to provide more than a single point of contact when the wheelbarrow 100 it tipped to a full dump position. The handle shafts 500 can be connected to the wheel guard 800 by any means known in the field including welding, riveting, or press-fitted parts; however, the preferred embodiment contemplates nuts 290 and bolts 280 to allow for simplified assembly or disassembly of the wheelbarrow 100 for repair or parts replacement. The wheel guard 800 has a front portion 820, rear portion 830, center 840, and an intermediate portion 860. The wheel guard center is defined as the mid-point in elevation of the front face of the wheel guard front portion 820. An embodiment of the wheel guard includes a handle 810 having uprights 812 and a grasp bar 817. The wheel guard 800 may also have a wheel guard opening 850 which is a coined indentation to add structural rigidity to the wheel guard 800.

Figure 21A:
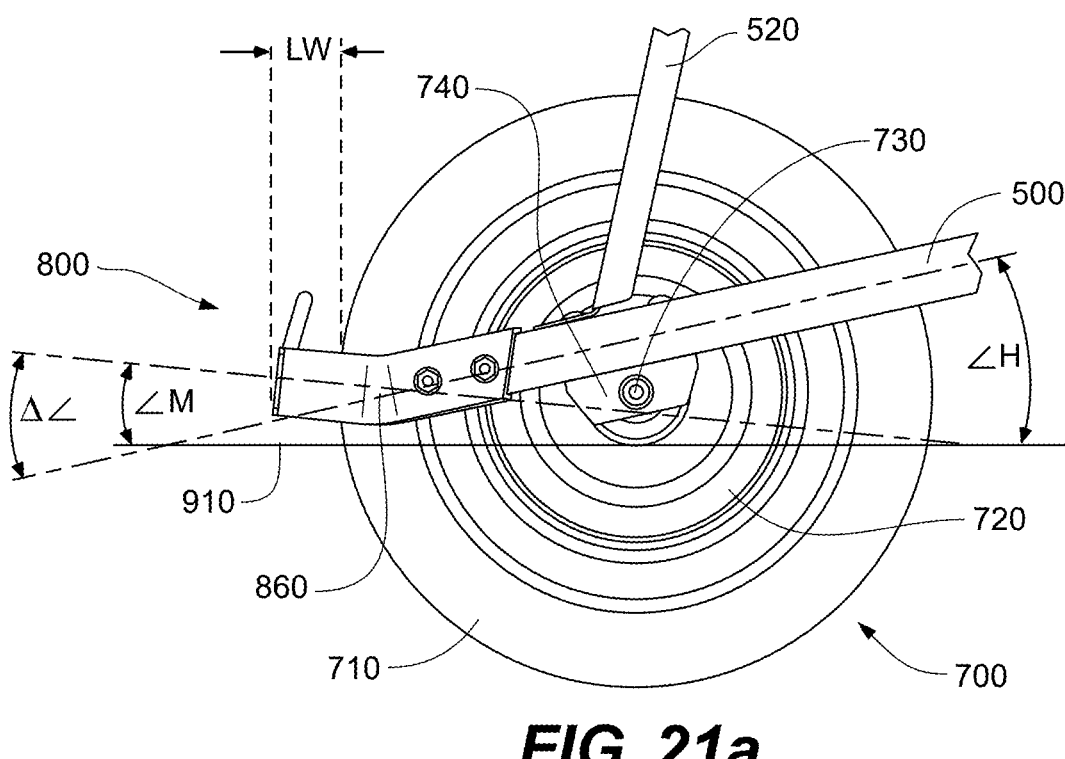
FIG. 21a is a detailed view depicting the front part of the wheelbarrow of FIG. 1 inside the arc C-C in FIG. 5.
Figure 21B:
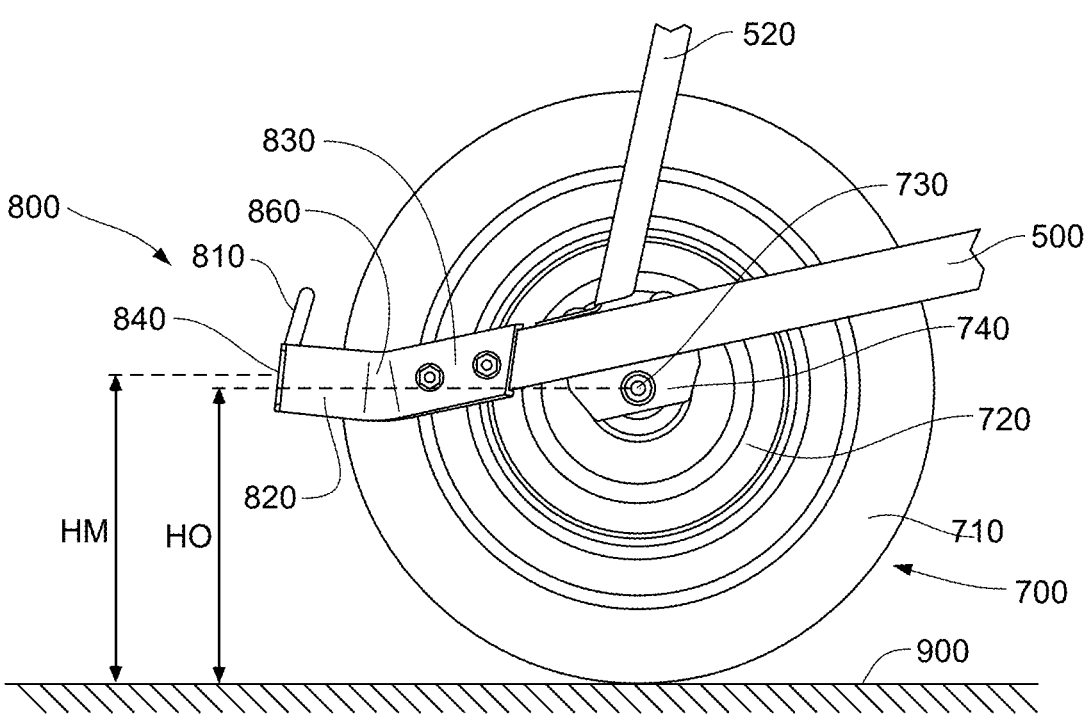
FIG. 21b is a detailed view depicting the front part of the wheelbarrow of FIG. 1 inside the arc C-C in FIG. 5.
Figures 22, 23:
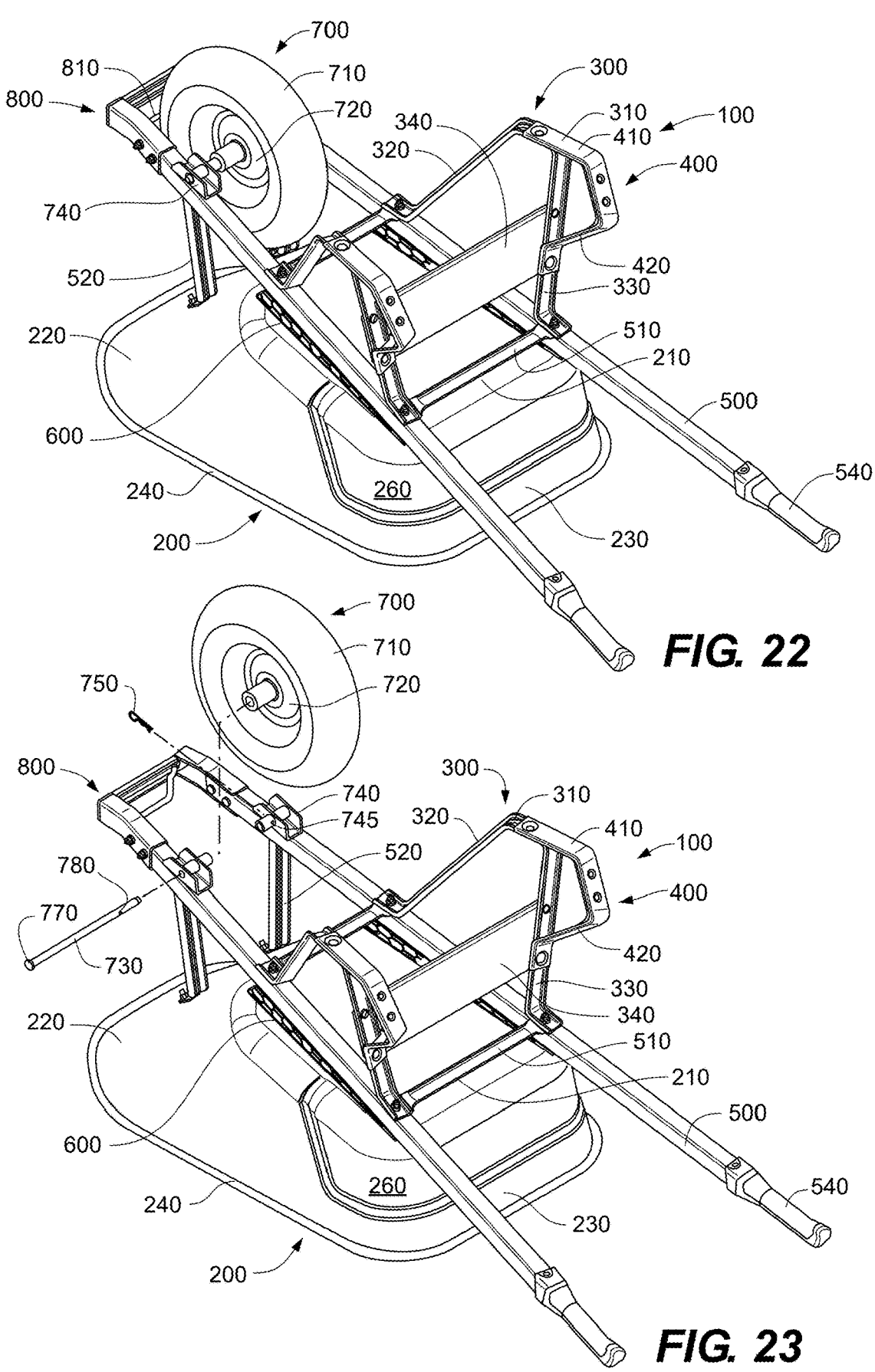
FIG. 22 is a rear perspective view depicting the wheelbarrow of FIG. 1 turned upside down.
FIG. 23 is a rear perspective view depicting the wheelbarrow of FIG. 1 turned upside down with the wheel and connecting parts separated from the wheelbarrow.
Figure 24:
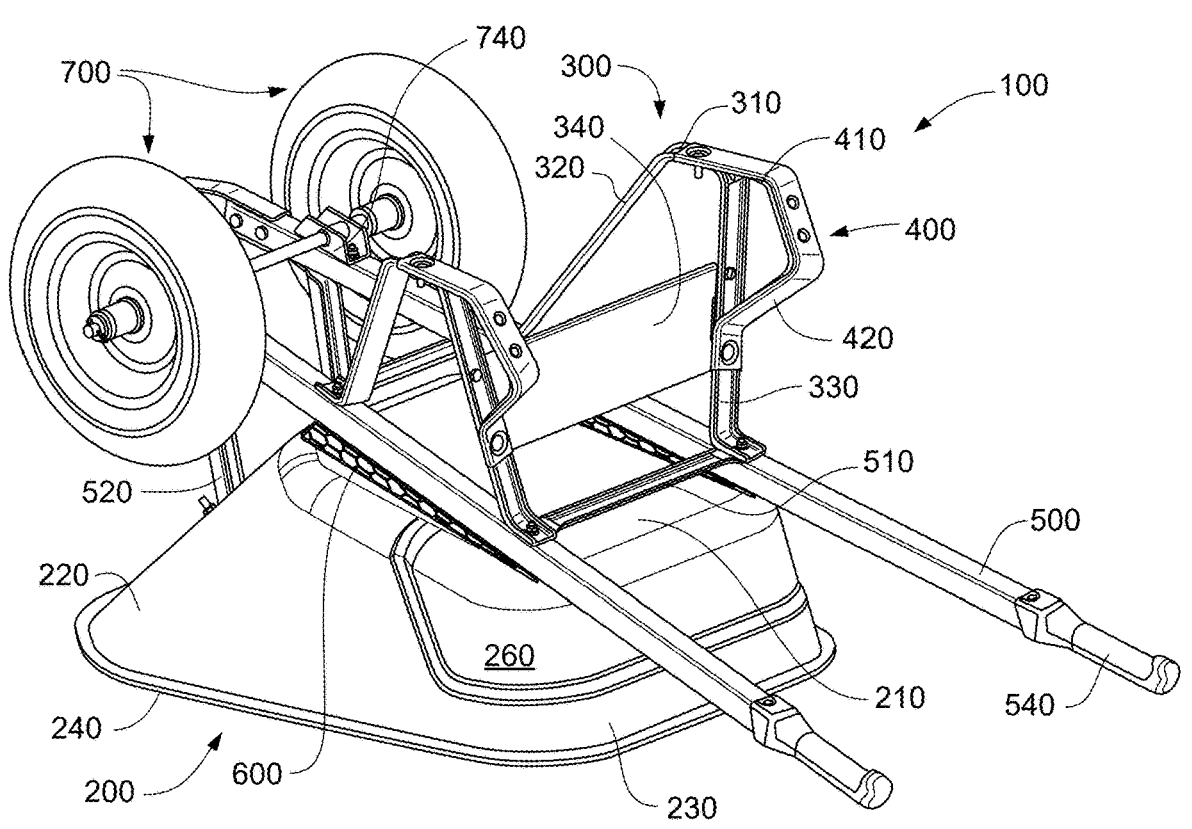
FIG. 24 is a rear perspective view depicting an embodiment of the wheelbarrow of FIG. 1 turned upside down having two wheels.
Figure 25:
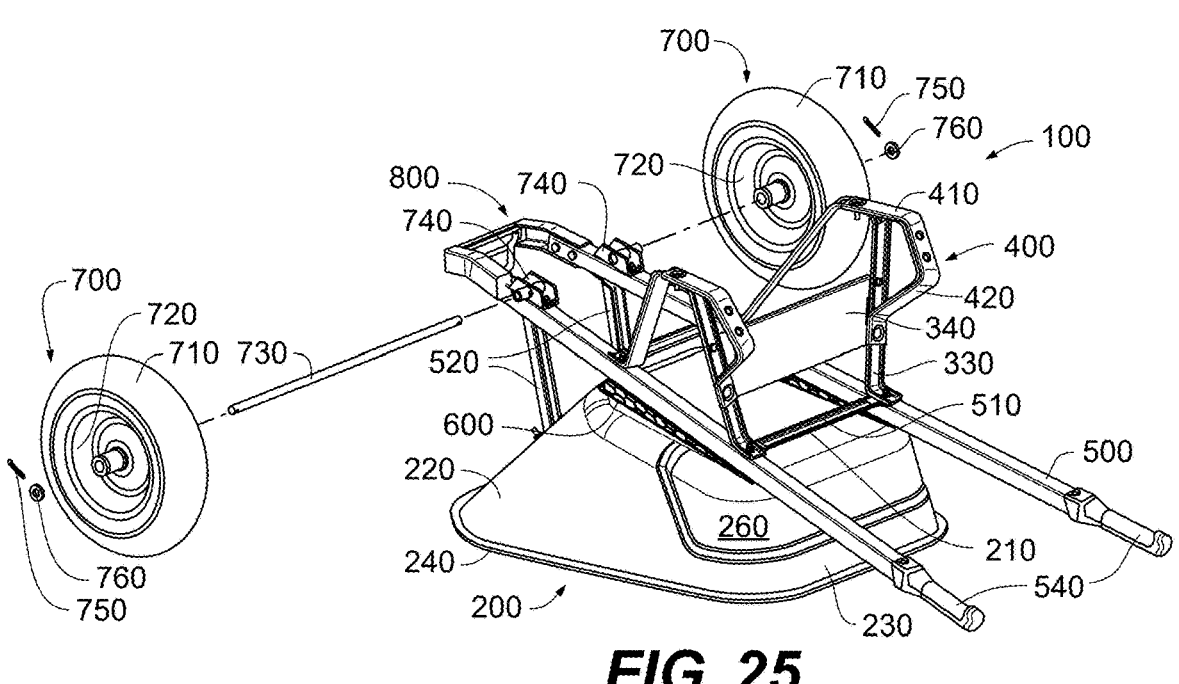
FIG. 25 is a rear perspective view depicting the wheelbarrow of FIG. 21 turned upside down with the wheels and connecting parts separated from the wheelbarrow.
Figure 26:
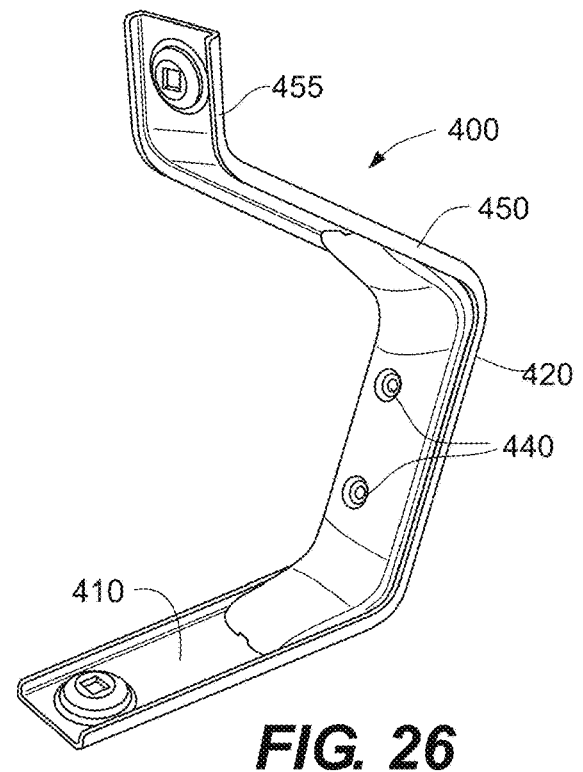
FIG. 26 is a front right perspective view depicting the stabilizer of the wheelbarrow of FIG. 1.
Figure 27:
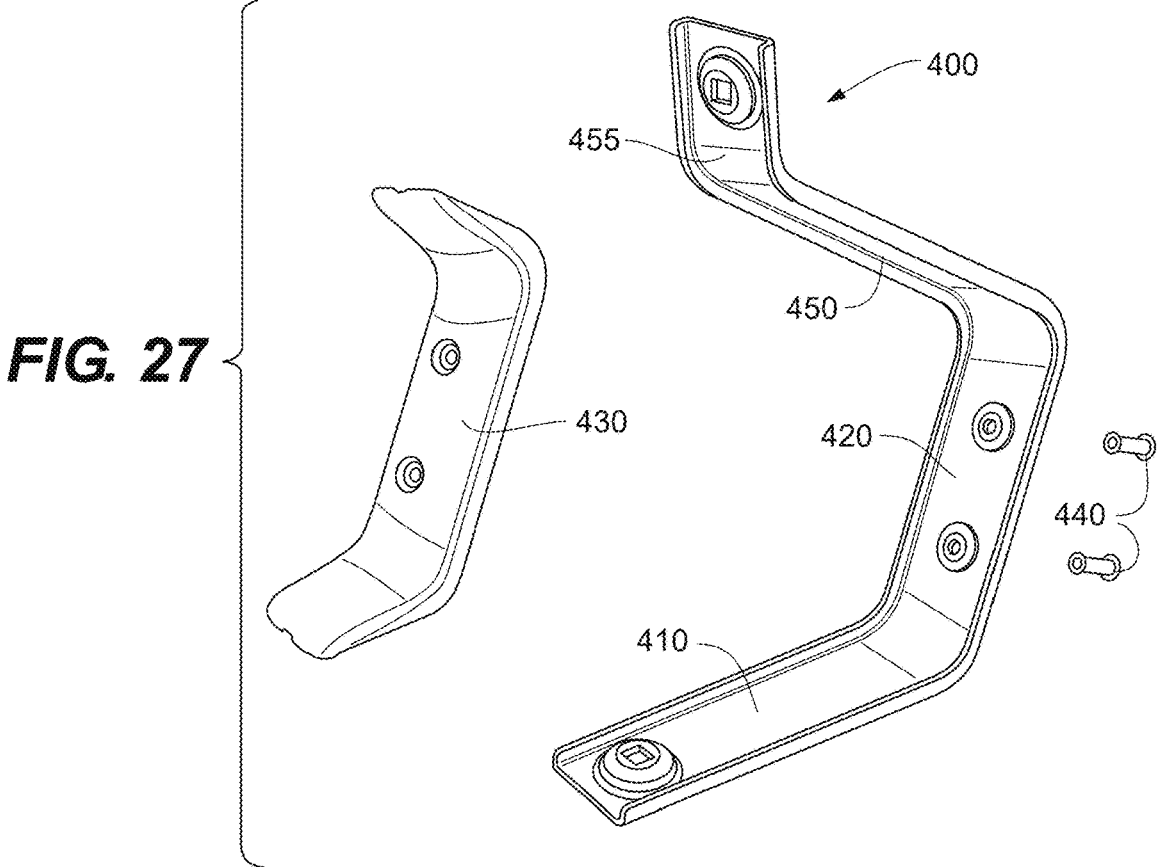
FIG. 27 is an exploded front right perspective view depicting the stabilizer of the wheelbarrow of FIG. 1.
Figures 28, 29, 30:
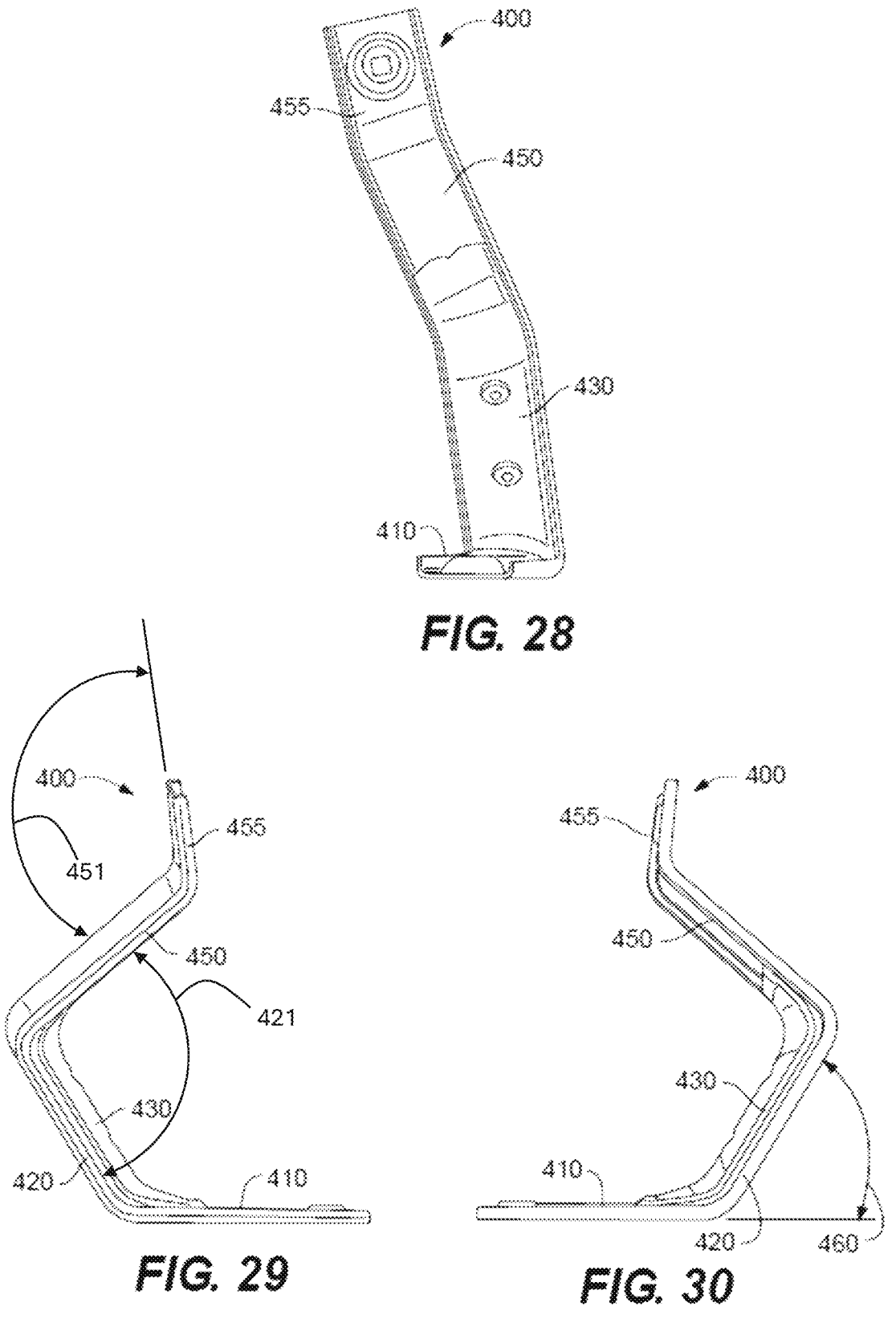
FIG. 28 is a front elevation view depicting the stabilizer of the wheelbarrow of FIG. 1.
FIG. 29 is left side elevation view depicting the stabilizer of the wheelbarrow of FIG. 1.
FIG. 30 is a right-side elevation view depicting the stabilizer of the wheelbarrow of FIG. 1.

The wheel guard 800 of the preferred embodiment is of a novel geometry that improves both dumping of loads from the wheelbarrow 100 and provides for better clearance while moving the wheelbarrow 100. As best seen in FIGS. 21a and 21b, several aspects of the disclosed wheel guard 800 improve performance of the wheelbarrow 100. As illustrated in FIG. 21a, the angle $\angle M$ that the wheel guard front portion 820 makes with a level surface 910 (defined as the plane formed by the bottoms of the wheel 700 and legs 300) results in the wheel guard 800 raising as it extends in front of the wheel 700. The preferred embodiment of $\angle M$ is within a range of one to eight degrees with six degrees being most preferred. This arrangement provides more clearance while moving the wheelbarrow 100 compared to prior art wheelbarrows.

Another novel aspect of the wheel guard 800 geometry is the angle difference $\Delta\angle$ between $\angle M$ and the angle $\angle H$ that the handle shaft 500 makes with a level surface 910. $\angle H$ is such that the handle shafts 500 decline toward their connection with the wheel guard 800 while $\angle M$ inclines away from the connection between the wheel guard 800 and handle shafts 500. The preferred embodiment of $\angle H$ is within a range of 10-14 degrees with 12 degrees being most preferred. However, $\angle H$ could also be up to 18 degrees if the wheel 700 is smaller to accomplish the novel arrangement that provides the benefits of the invention. The wheel guard rear portion 830 of the preferred embodiment makes the same angle with a level surface 910 as angle $\angle H$ of the handle shaft 500. This arrangement provides improved functionality in the operation of the wheelbarrow 100 as illustrated by FIGS. 79a-d. The preferred embodiment of $\Delta\angle$ is within a range of 15-21 degrees with 18 degrees being most preferred. However, the present invention contemplates that $\Delta\angle$ can be anywhere between 5-30 degrees and still provide the benefits of the invention.

Figures 79A, 79B, 79C, 79D:
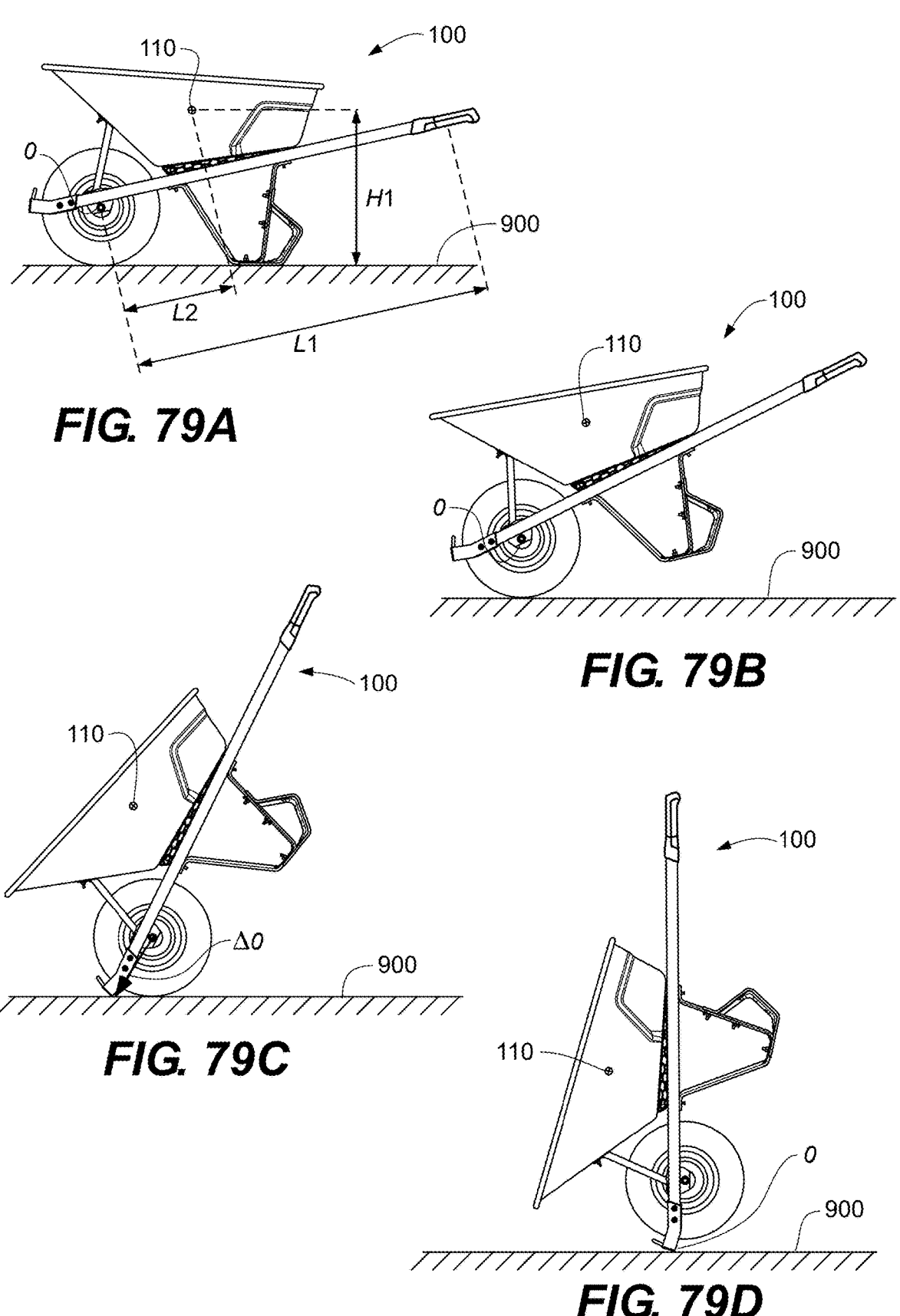
FIGS. 79A-79D are right side views of the wheelbarrow of FIG. 1 in four positions: resting (FIG. 79A), transporting (FIG. 79B), dumping (FIG. 79C), and full-dump (FIG. 79D).

FIG. 79a presents an embodiment of the wheelbarrow 100 in its resting position on a ground surface 900. In this position the leg bottom portion 310 (FIGS. 33-40), the stabilizer bottom portion 410 (FIGS. 26-32), and bottom of wheel 700 are all contacting the ground surface 900. As best seen in FIG. 21*b*, in this position the center 840 of the front of the wheel guard 800 is elevated at a distance HM above the ground surface 900. In a preferred embodiment, the distance is longer than the distance HO from the center of the axle 740 to the ground surface 900. The benefit of this arrangement will be explained in more detail in further discussion of FIGS. 79*a-d*.

When the wheelbarrow 100 is in the transport position (FIG. 79*b*) only the wheel 700 is in contact with the ground surface 900. The novel arrangement of ∠M allows the front of the wheel guard 800 to stay higher above the ground surface 900 than prior art wheelbarrows 100, providing more clearance of potential obstacles (brush, rocks, steps) while transporting the wheelbarrow 100.

Yet another improved feature of the wheel guard that improved performance both during transport (FIG. 79*b*) and during dumping (FIGS. 79*c-d*) is the shorter distance LW between the front of the wheel 700 and the front of the wheel guard 800 than found in prior art wheelbarrows. Distance LW is less than 2.5 inches, but sufficient to accommodate four gloved fingers of a human adult grasping the wheel guard handle 810.

A further improvement of the present invention is the addition of a wheel guard handle 810 across the top of the wheel guard 800 (FIGS. 15-20). The wheel guard handle 810 provides an ergonomic means for a user to grasp the front of the wheelbarrow 100 to lift it either over obstacles or onto elevated surfaces. The wheel guard handle 810 is sized to allow a gloved adult user to fit at least four fingers under the handle grasp bar 817 and to be able to wrap those fingers completely around the handle grasp bar 817. While the wheel guard handle 810 can be separate structure from the wheel guard 800, the preferred embodiment includes the handle 810 and wheel guard 800 being a single unibody structure and made of metal for durability and strength. While not necessary, it is also contemplated that the wheel guard handle 810 be constructed either with knurls or have a coating or wrap to improve handling grip and comfort.

Figure 47:
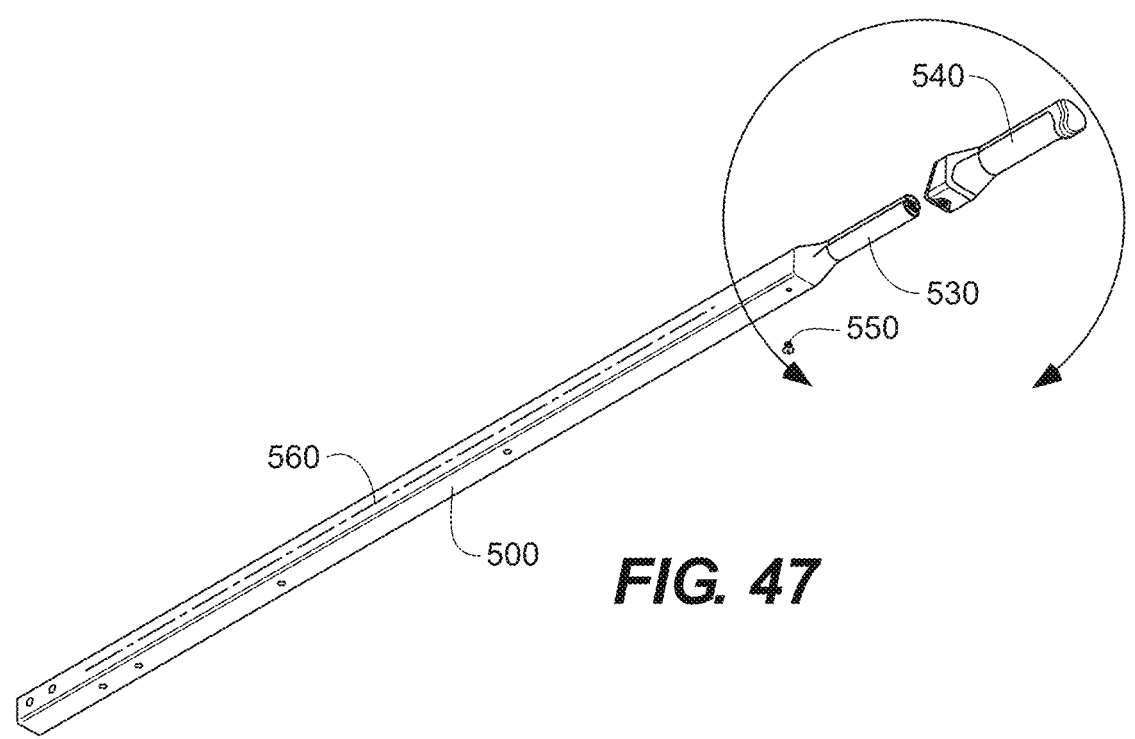
FIG. 47 is an exploded bottom rear perspective view depicting the handle of the wheelbarrow of FIG. 1.
Figure 48:
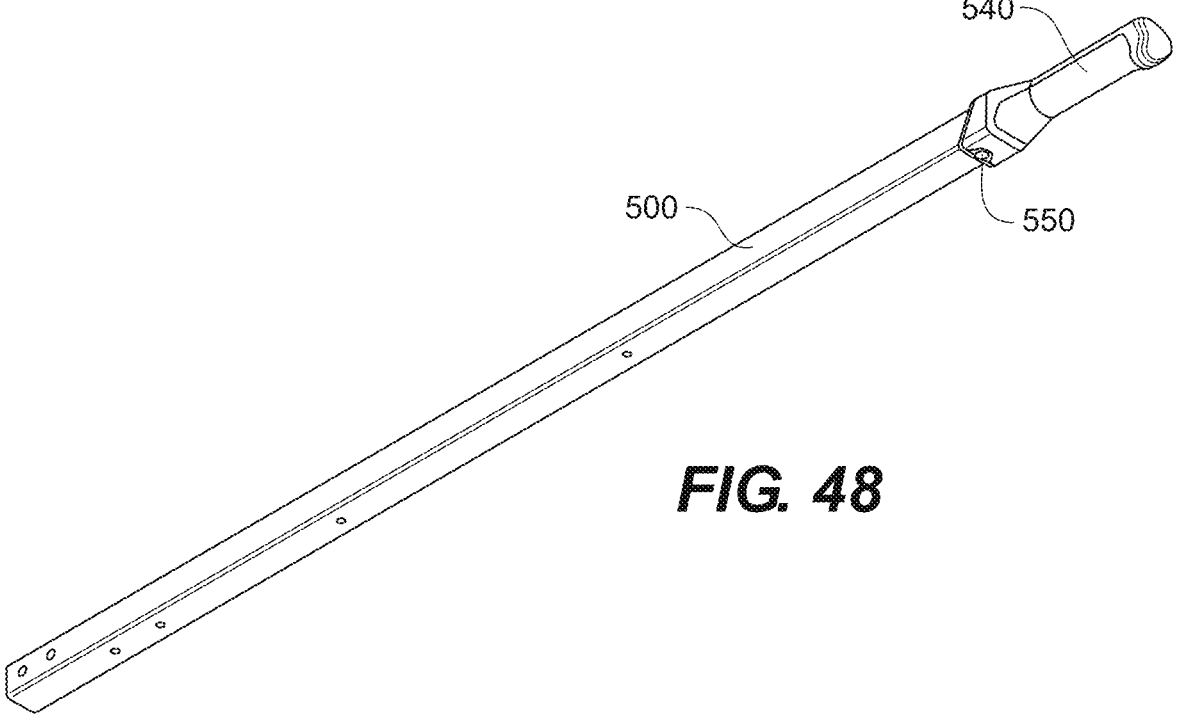
FIG. 48 is a bottom rear perspective view depicting the handle of the wheelbarrow of FIG. 1.
Figure 49:
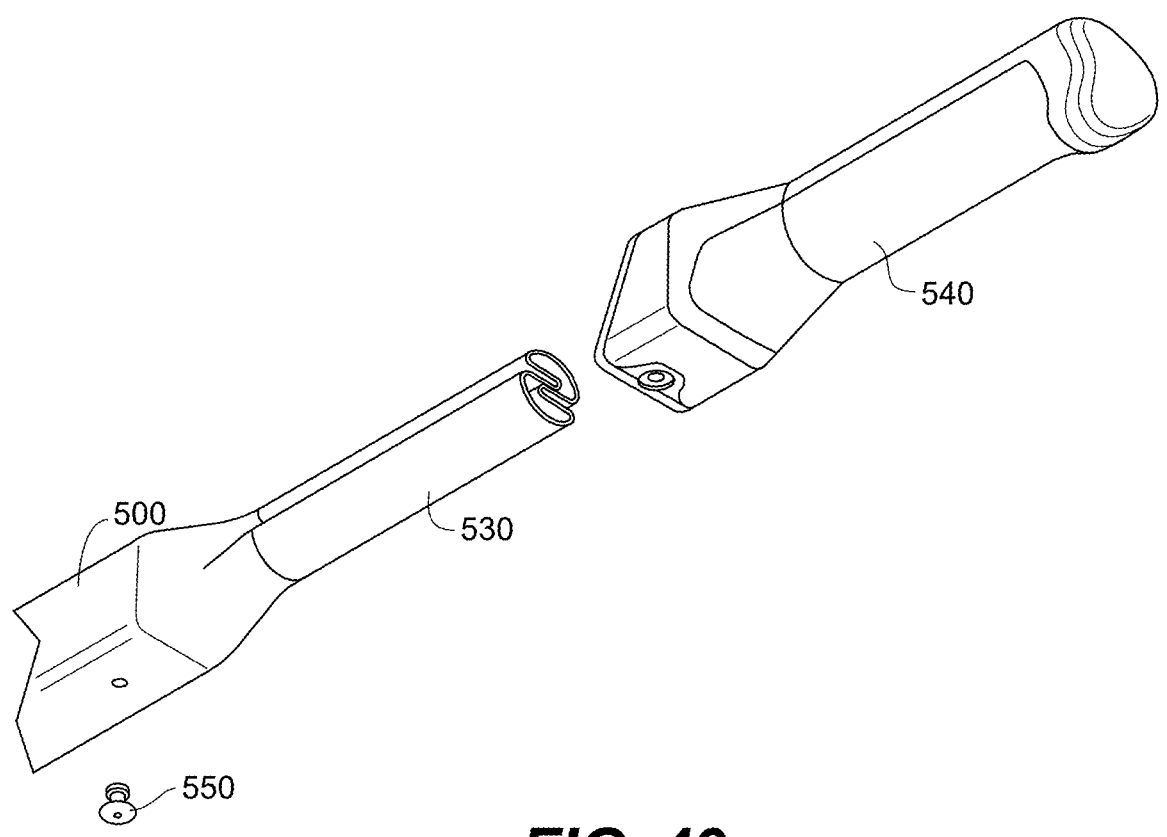
FIG. 49 is a detailed view depicting the handle of the wheelbarrow of FIG. 1 inside the arc I-I in FIG. 47.
Figure 50:
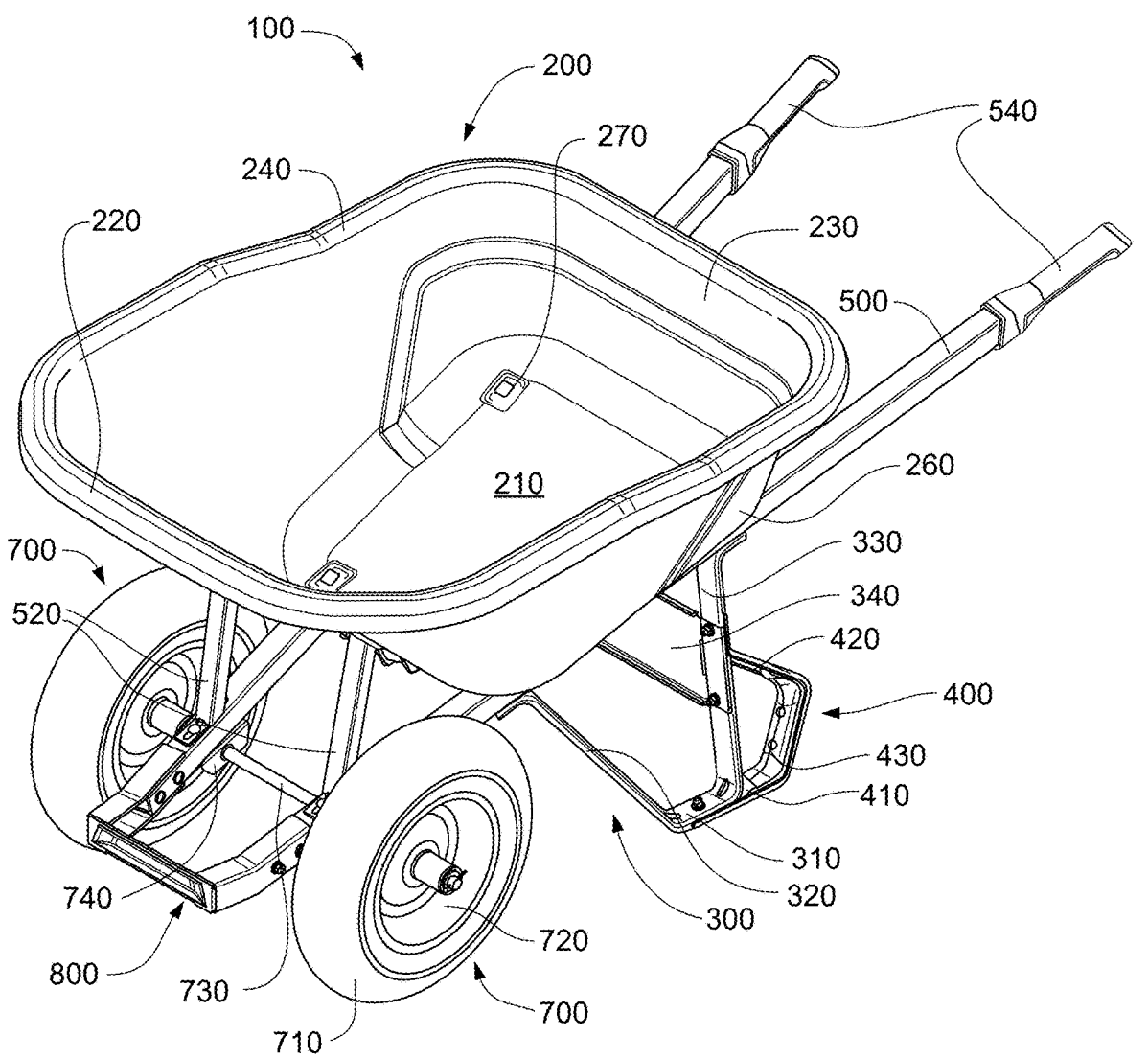
FIG. 50 is a top front perspective view depicting a wheelbarrow in accordance with an alternate embodiment of the disclosure.
Figure 51:
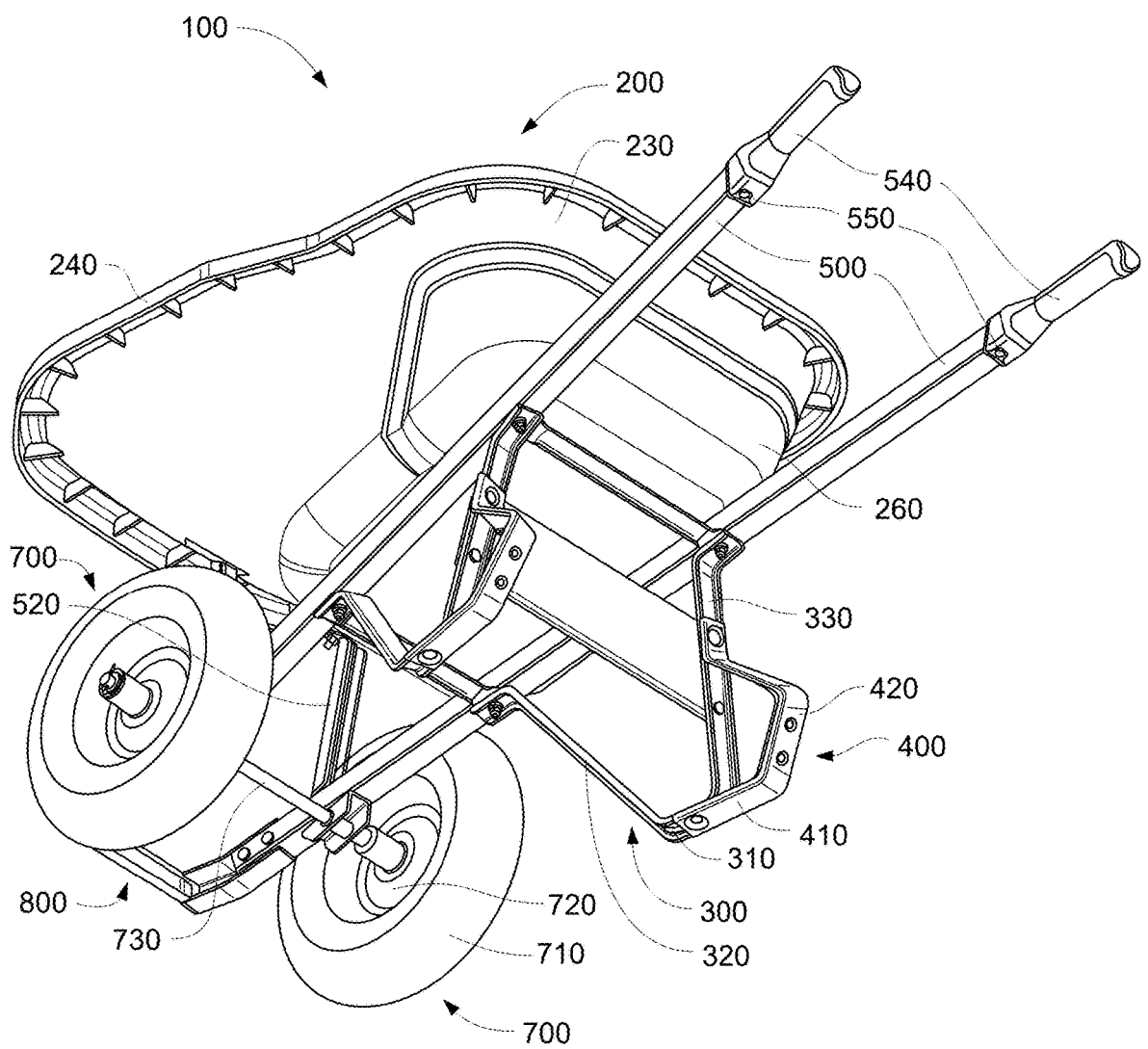
FIG. 51 is a bottom rear perspective view depicting the wheelbarrow of FIG. 50.
Figure 52:
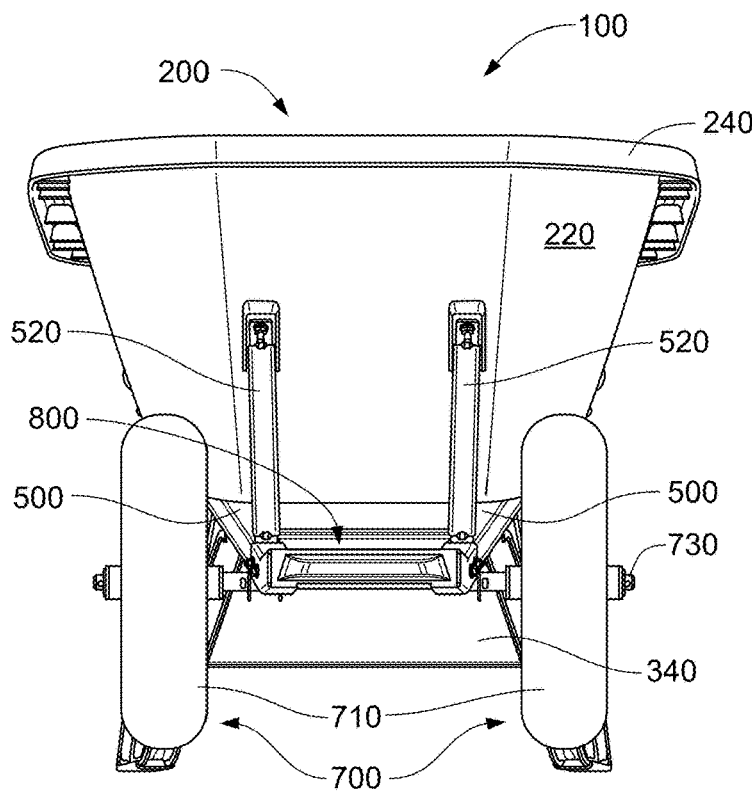
FIG. 52 is a front elevation view depicting the wheelbarrow of FIG. 50.
Figure 53:
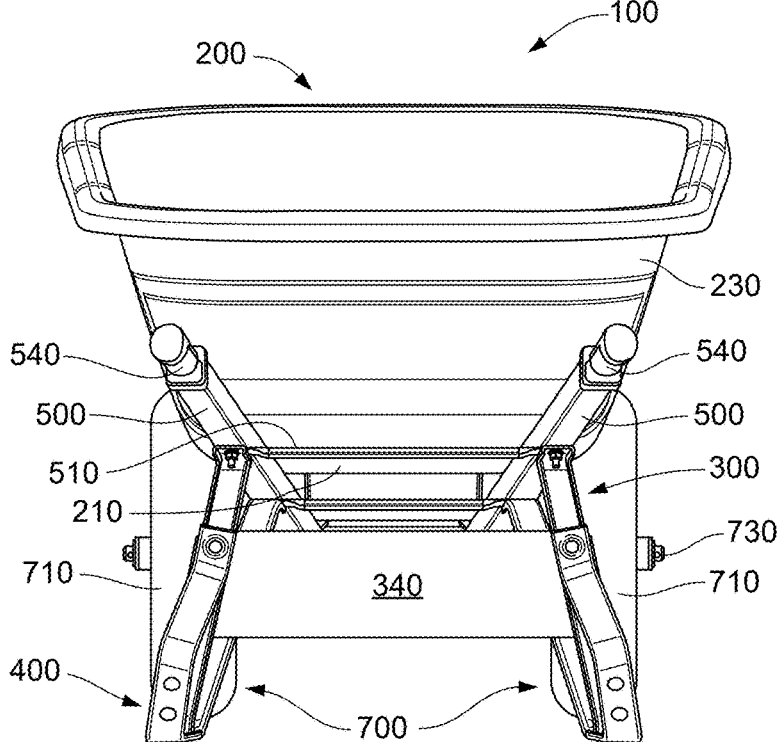
FIG. 53 is a rear elevation view depicting the wheelbarrow of FIG. 50.
Figure 54:
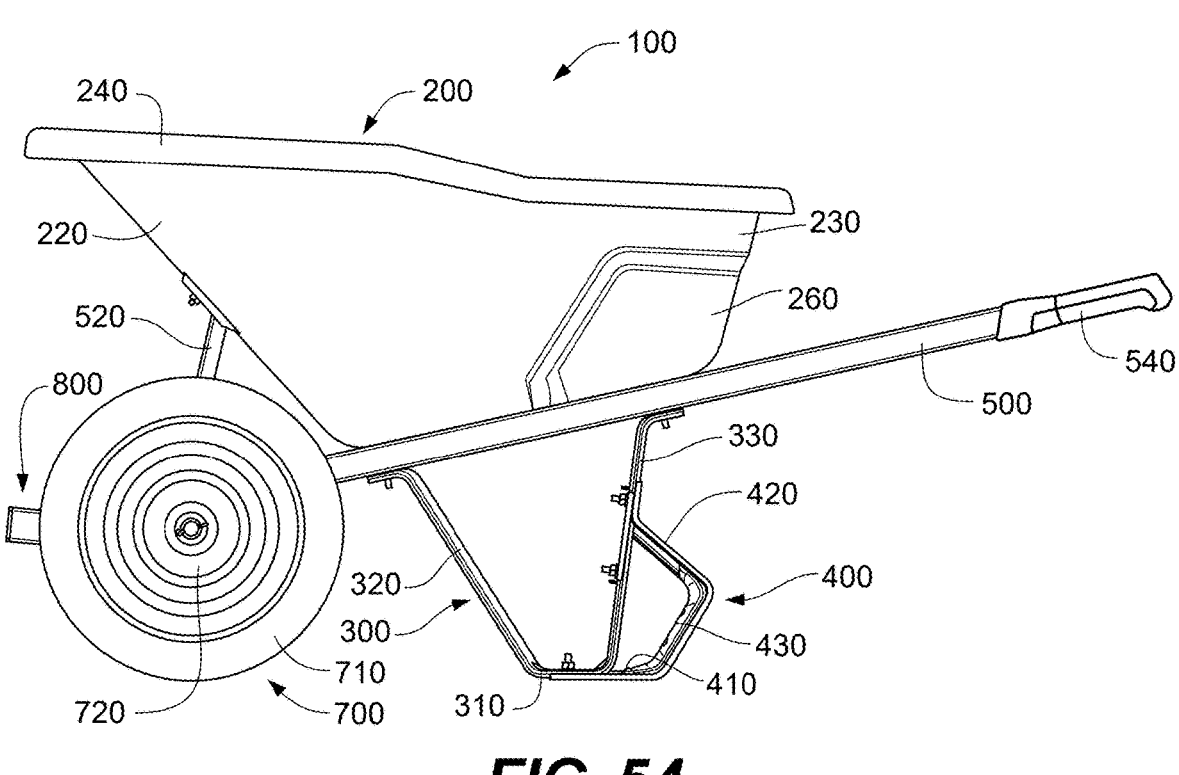
FIG. 54 is a right-side elevation view depicting the wheelbarrow of FIG. 50.
Figure 55:
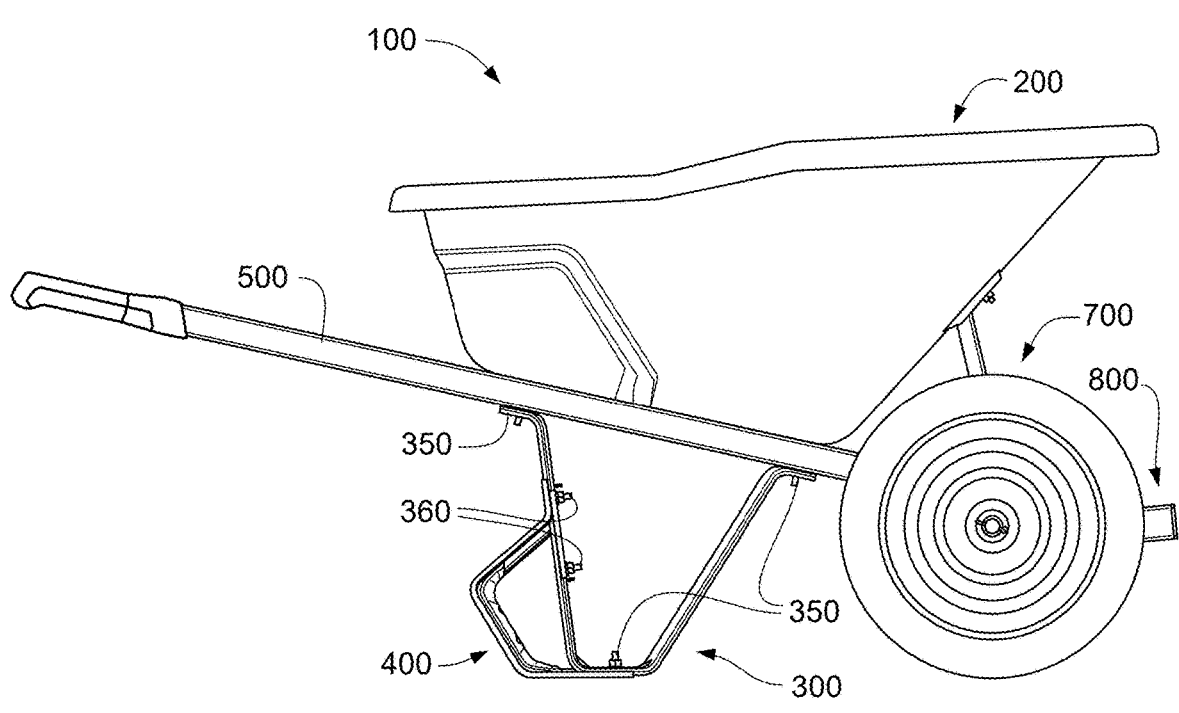
FIG. 55 is a left side elevation view depicting the wheelbarrow of FIG. 50.
Figures 56, 57:
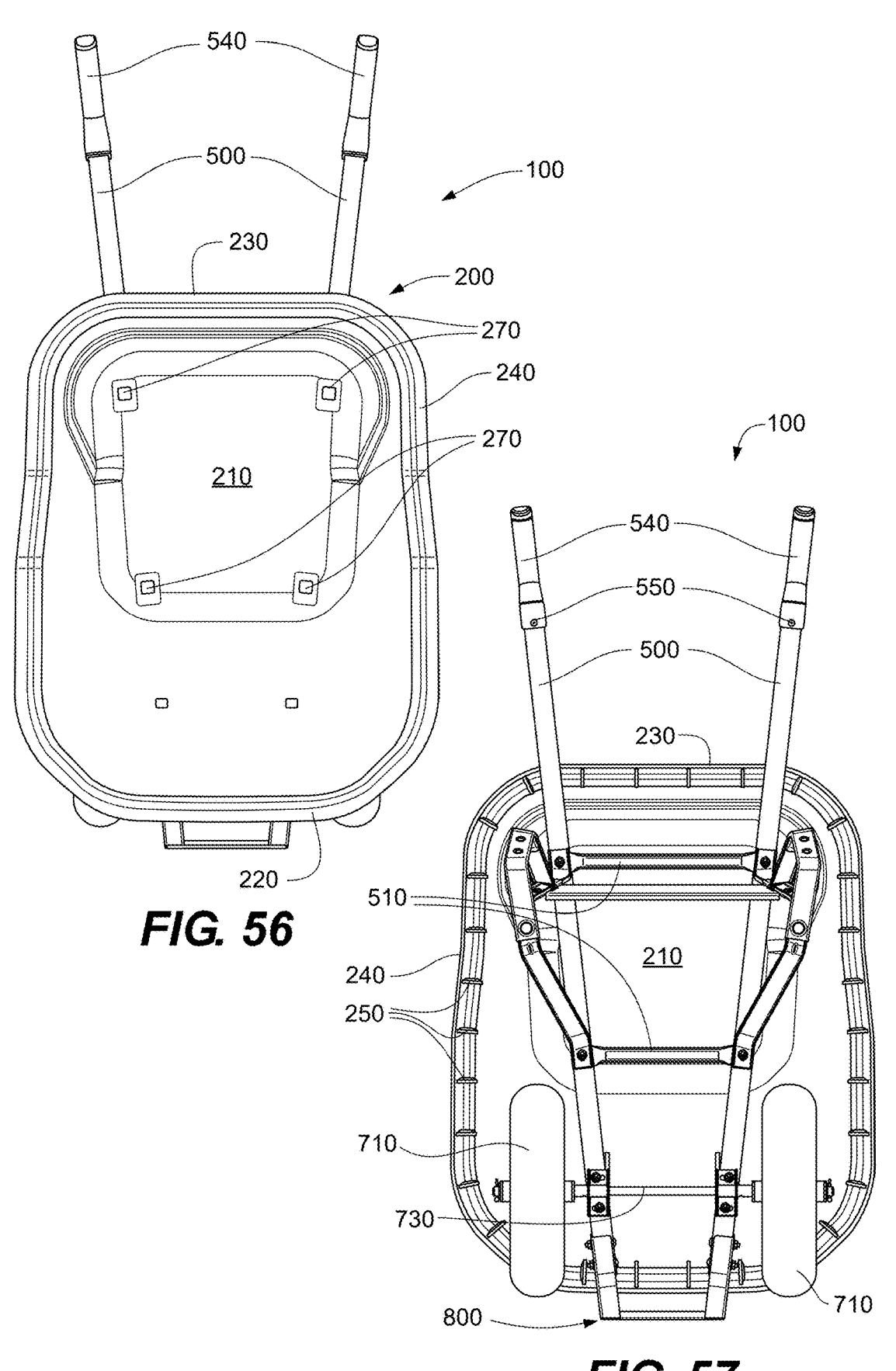
FIG. 56 is a top view depicting the wheelbarrow of FIG. 50.
FIG. 57 is a bottom view depicting the wheelbarrow of FIG. 50.
Figure 58:
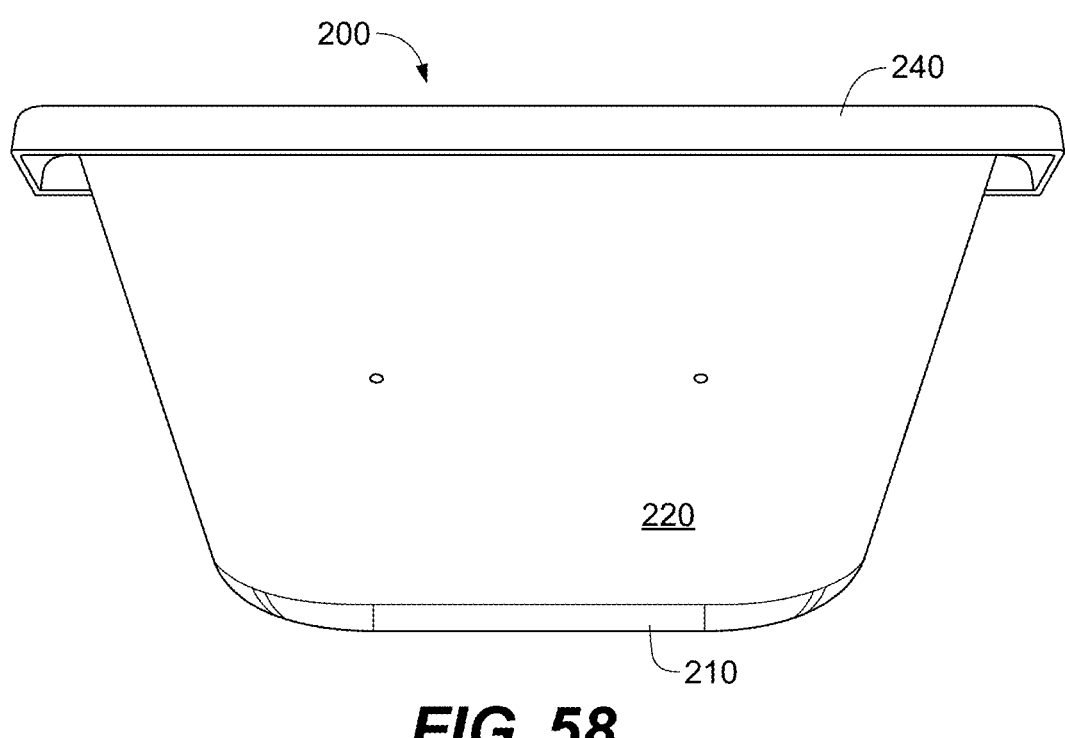
FIG. 58 is a front elevation view depicting the tub of the wheelbarrow of FIG. 50.
Figure 59:
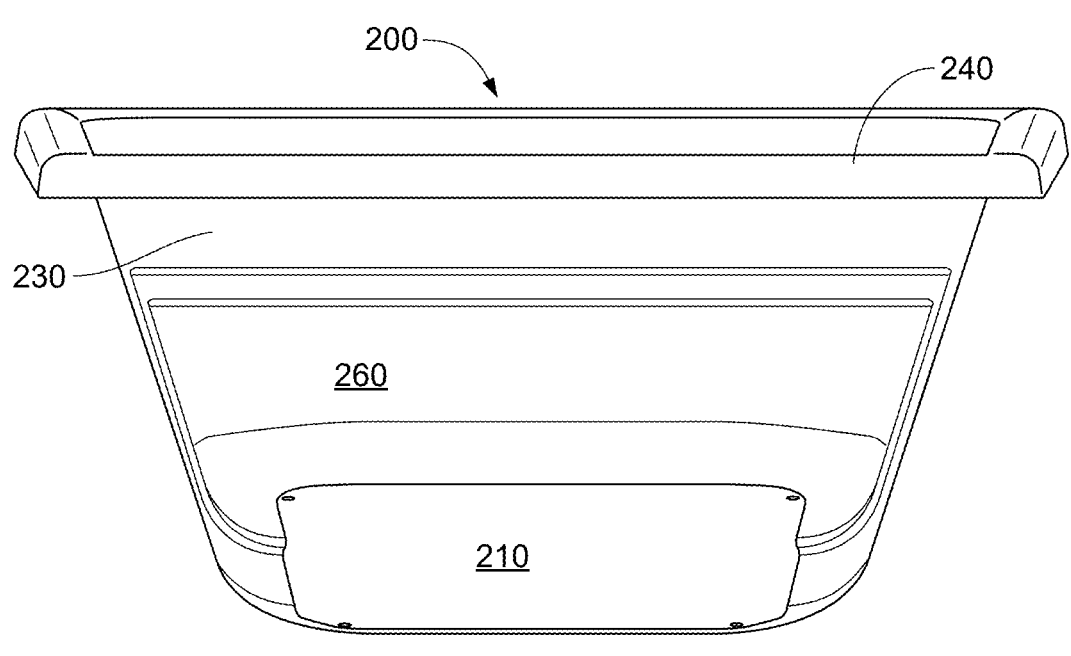
FIG. 59 is a rear elevation view depicting the tub of the wheelbarrow of FIG. 50.
Figure 60:
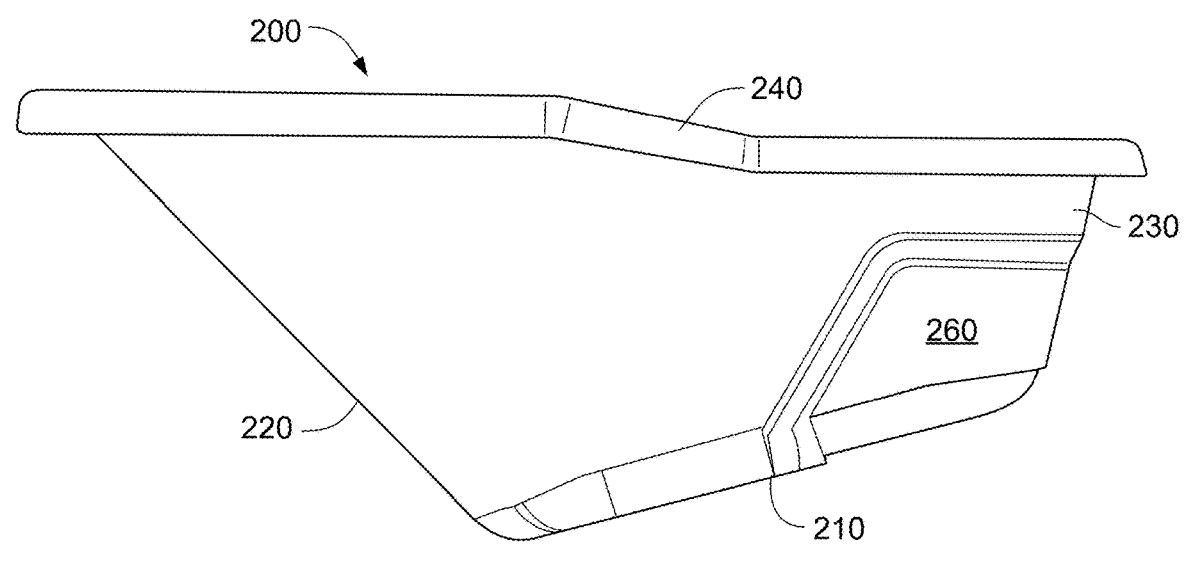
FIG. 60 is a right-side elevation view depicting the tub of the wheelbarrow of FIG. 50.
Figure 61:
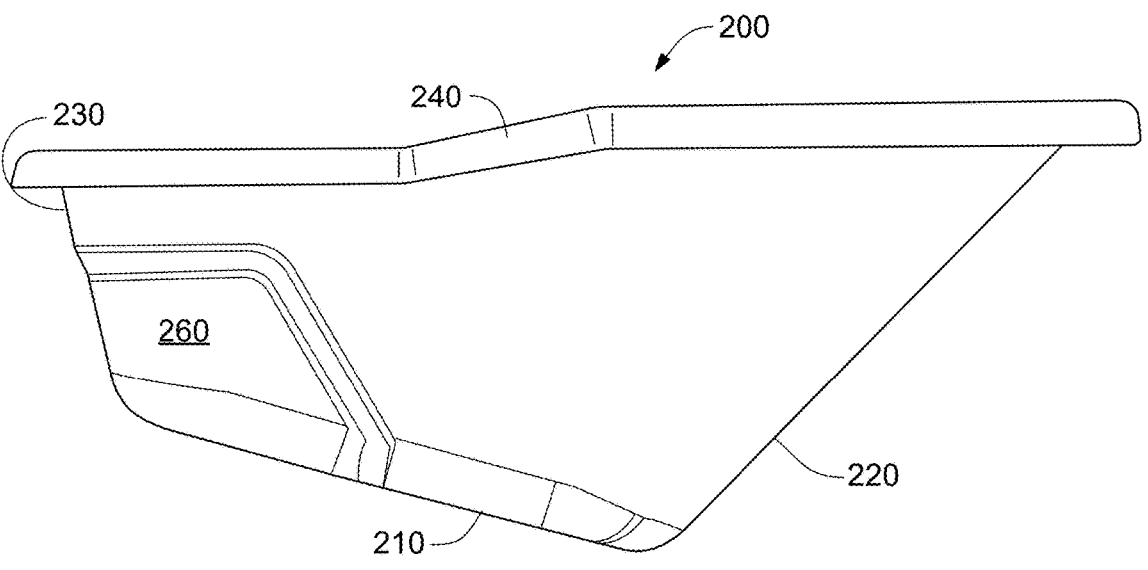
FIG. 61 is a left side elevation view depicting the tub of the wheelbarrow of FIG. 50.

FIGS. 47-49 present a further improvement of the wheelbarrow 100 in the design of the handle shafts 500. The handle shafts 500 can be of any shape or material, but are preferably made of square tubular metal for strength and durability. Other contemplated materials include wood, fiberglass, plastic, or any other material known in the field. The handle shafts 500 are formed at their distal ends from their connection to the wheel guard 800 to provide a handle 530. The preferred embodiment of the handle shaft has an axis 560 forming an angle with a horizontal line that is the same angle ∠H as that of the wheel guard rear portion 830. The handle 530 allows the handle shafts 500 to be larger and of any shape while still allowing a user to comfortably grip the handle shafts 500 for moving or lifting the wheelbarrow 100. Another improvement of the disclosure is the addition of a plastic handle grip 540 over each of the handles 530. The handle grip 540 is made of a durable plastic that is formed to tightly fit over the handle 530 end with a rivet 550 installed through the bottom of the handle grip 540 and into the handle 530 to secure it in place. Some prior art wheelbarrows have used an adhesive or friction fit alone to keep the handle grip 540 on the handle 530, but these methods fail over time. Others have used bolts to hold the handle grip 540 on the handle 530, but such an arrangement results in an exposed metal surface that rusts or can scratch a user. The preferred type of rivet 550 is of a pop rivet, but other methods of riveting known in the field can also be used to secure the handle grip 540 to the handle 530.

Figure 3:
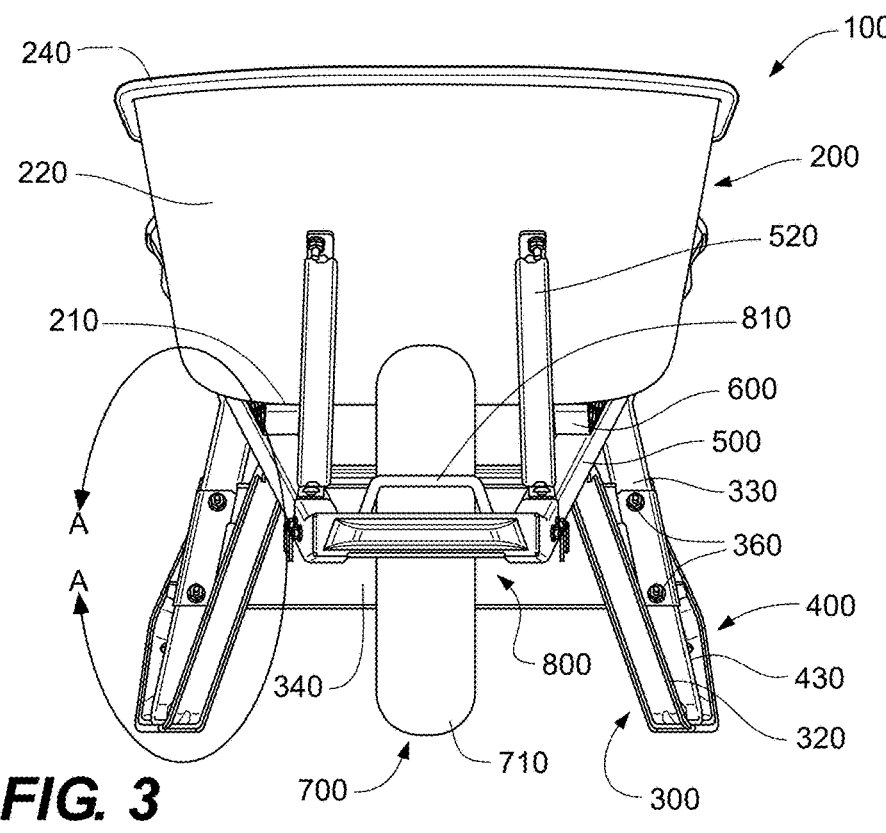
FIG. 3 is a front elevation view depicting the wheelbarrow of FIG. 1.
Figure 4:
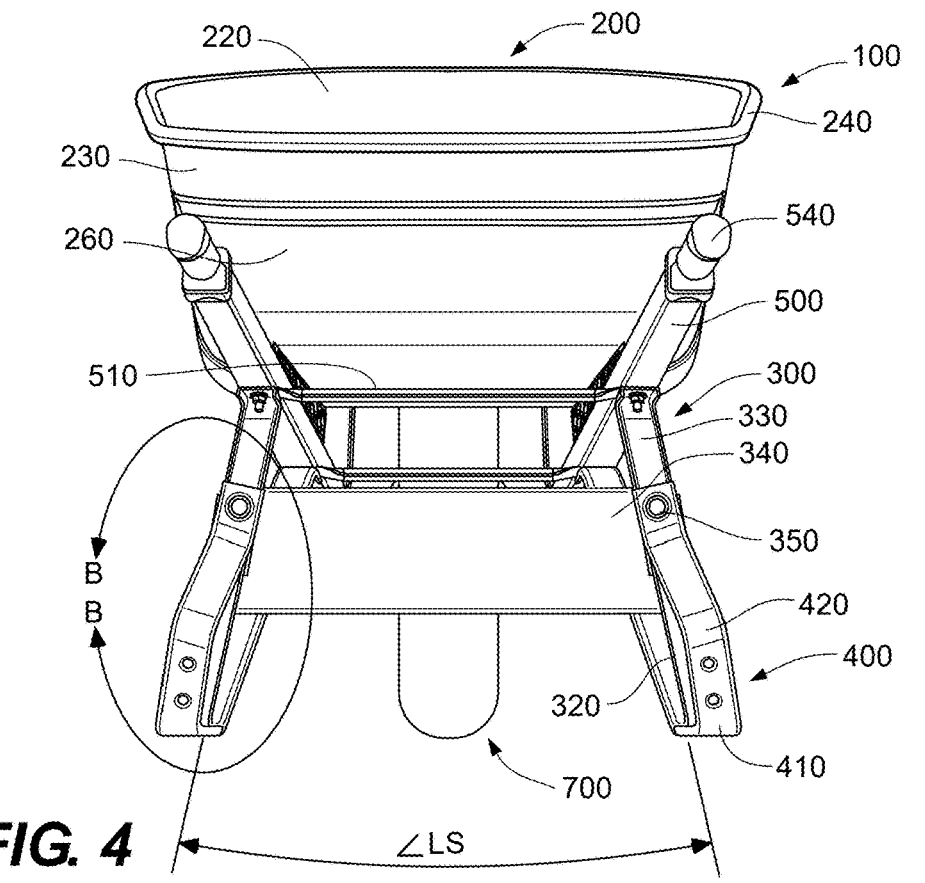
FIG. 4 is a rear elevation view depicting the wheelbarrow of FIG. 1.

FIGS. 33-40 present another embodiment of the wheelbarrow 100 with regard to the legs 300. The legs 300 are preferably constructed as a unibody part having a leg front portion 320, leg front tab 325, leg rear portion 330, leg rear tab 335, leg bottom portion 310, and having a width 370. A leg brace 340 (seen in FIGS. 1-2) may span between the two legs 300 to provide additional stability and strength to the legs 300. As seen in FIGS. 3-4, the novel aspect of the legs 300 is the flared design to produce a wider and more stable stance to the wheelbarrow 100. The preferred embodiment of angle ∠LS formed between the two leg rear portions 330 is within 23-28 degrees with 25.5 degrees being most preferred. This arrangement allows for the leg rear portions 330 to be 2.5 inches wider than conventional wheelbarrows and results in the wheelbarrow 100 of the present invention being approximately 10 percent more stable than prior art wheelbarrows.

Figure 5:
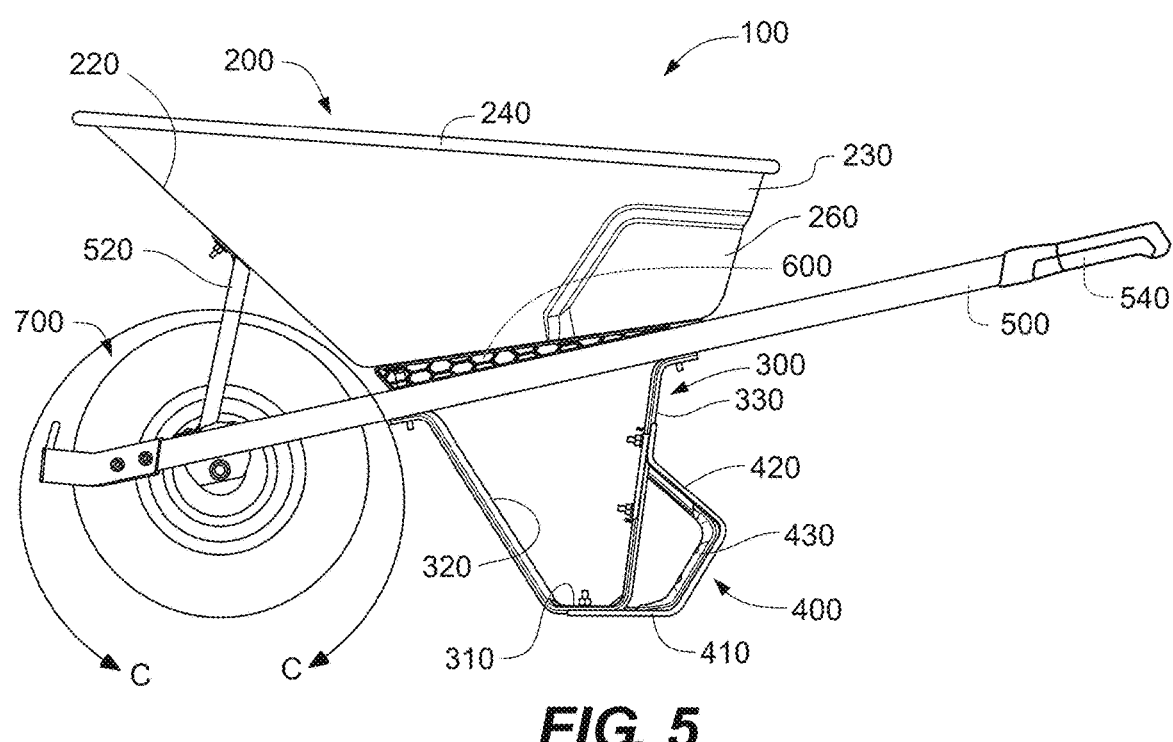
FIG. 5 is a right-side elevation view depicting the wheelbarrow of FIG. 1.
Figure 6:
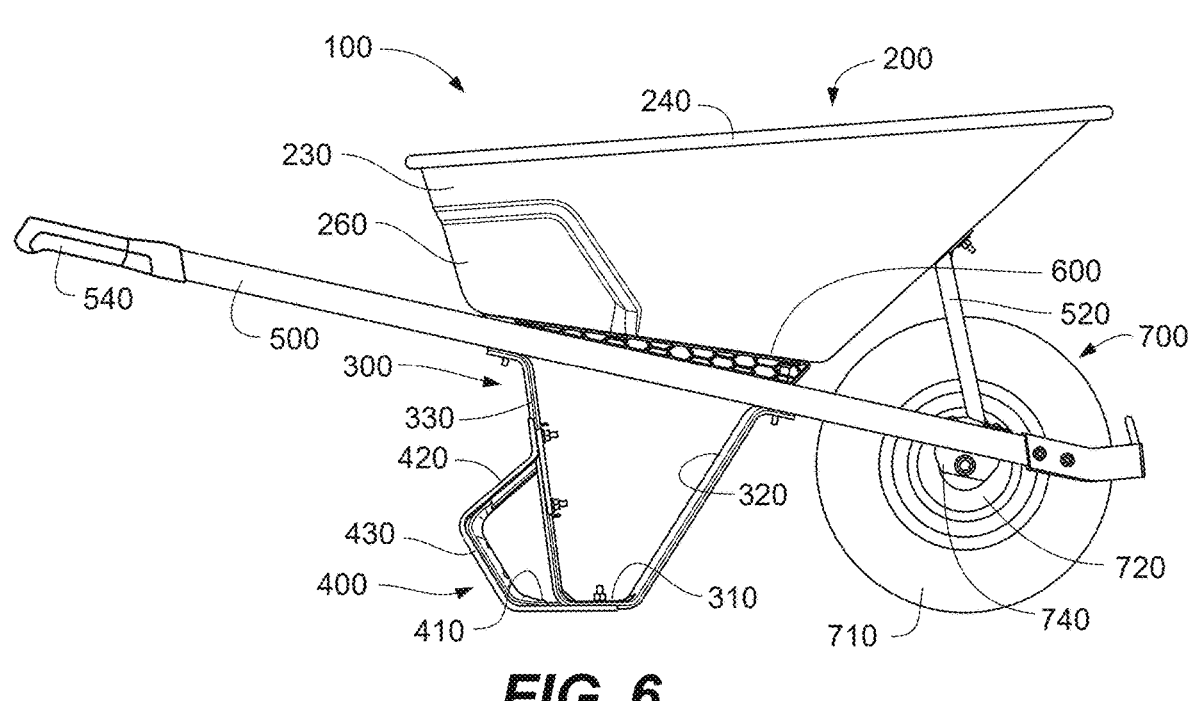
FIG. 6 is a left side elevation view depicting the wheelbarrow of FIG. 1.
Figures 7, 8:
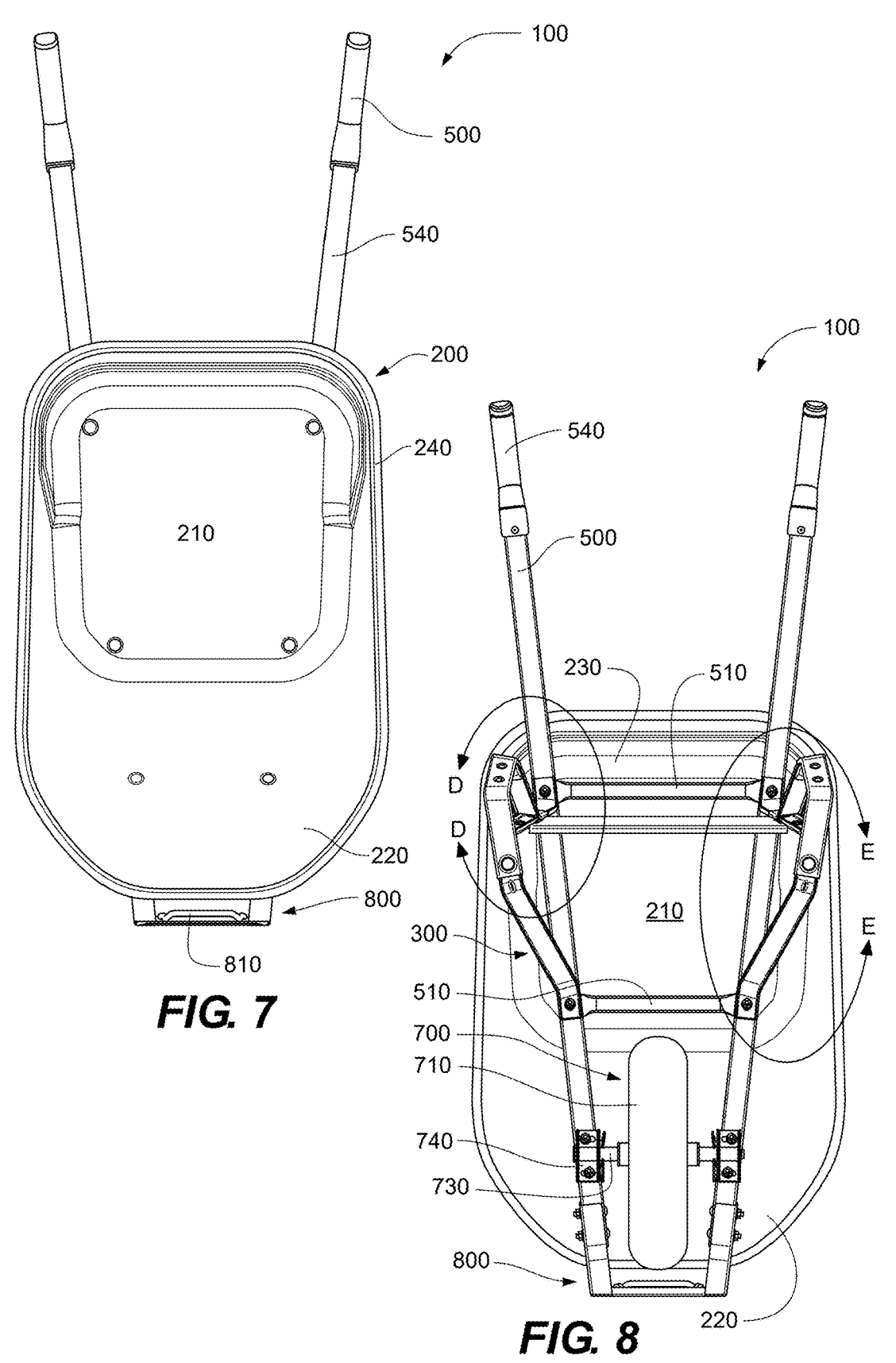
FIG. 7 is a top view depicting the wheelbarrow of FIG. 1.
FIG. 8 is a bottom view depicting the wheelbarrow of FIG. 1.
Figure 9:
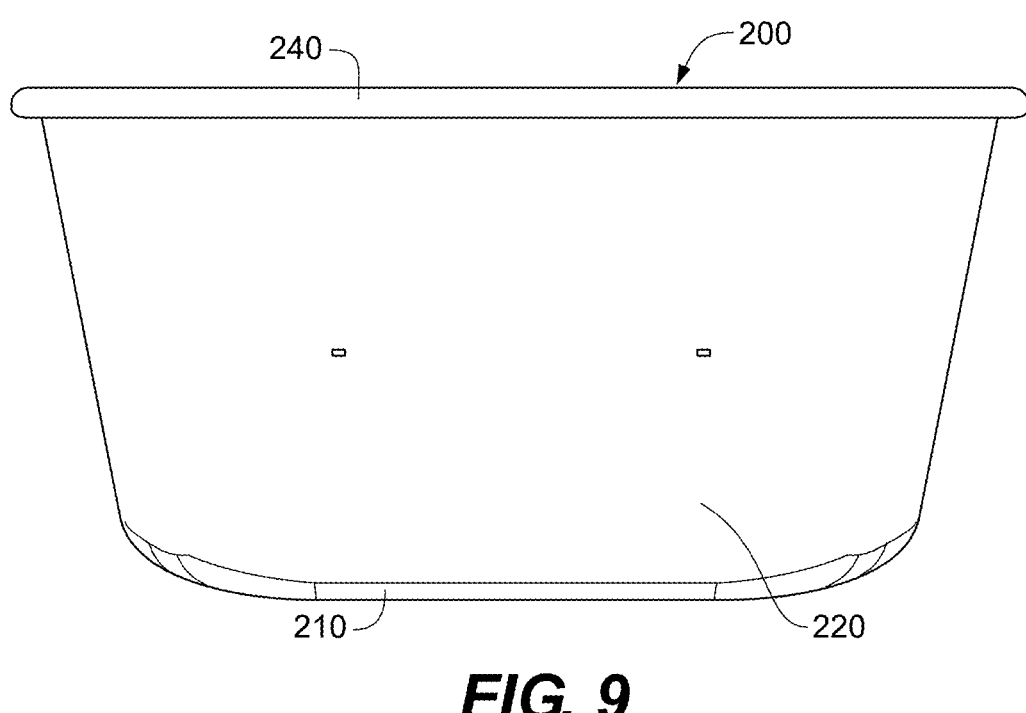
FIG. 9 is a front elevation view depicting the tub of the wheelbarrow of FIG. 1.
Figure 10:
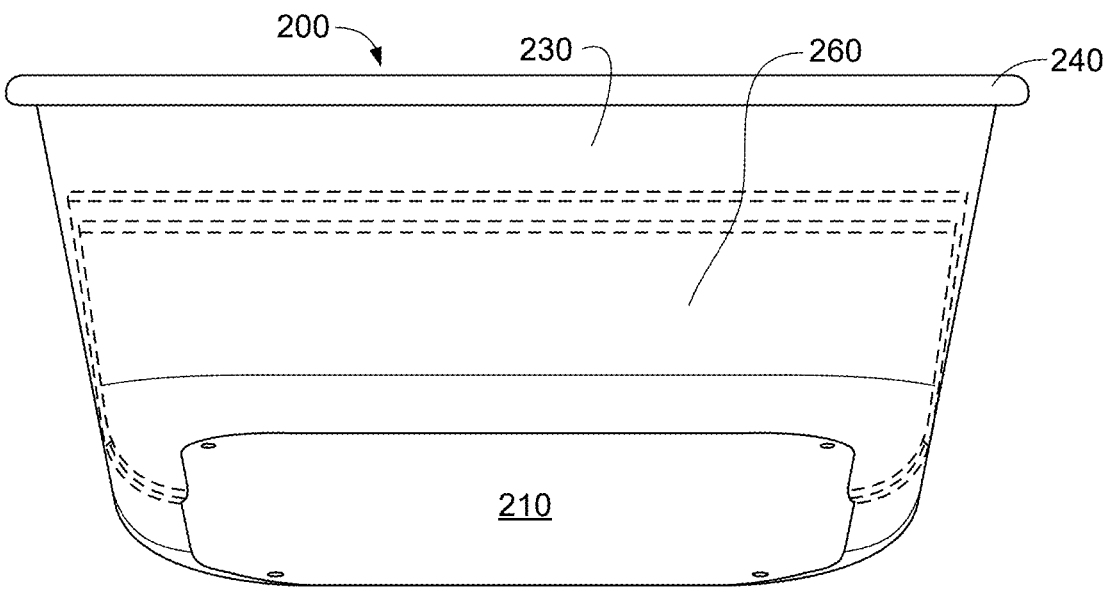
FIG. 10 is a rear elevation view depicting the tub of the wheelbarrow of FIG. 1.
Figure 11:
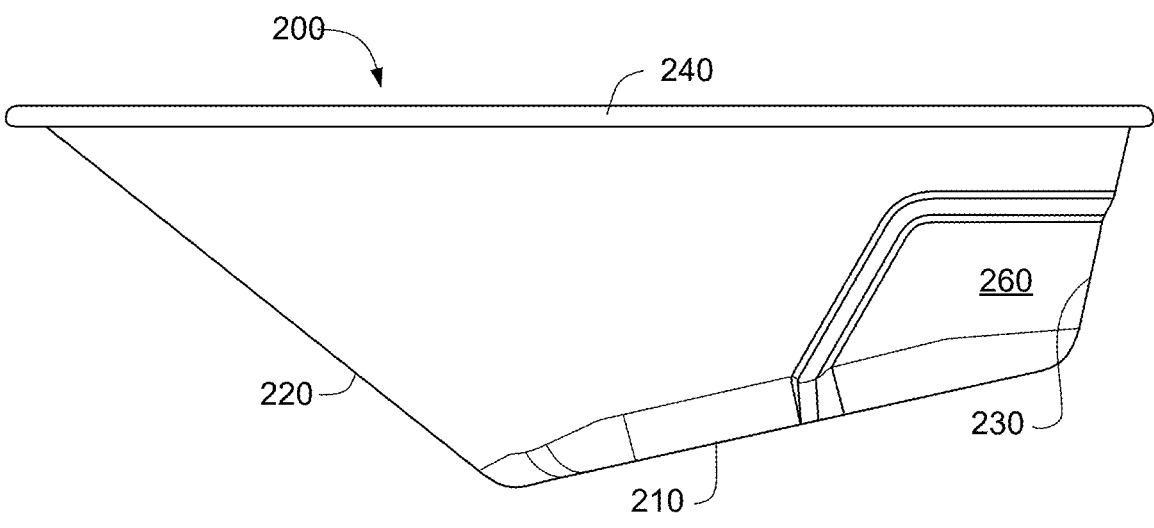
FIG. 11 is a right-side elevation view depicting the tub of the wheelbarrow of FIG. 1.
Figure 12:
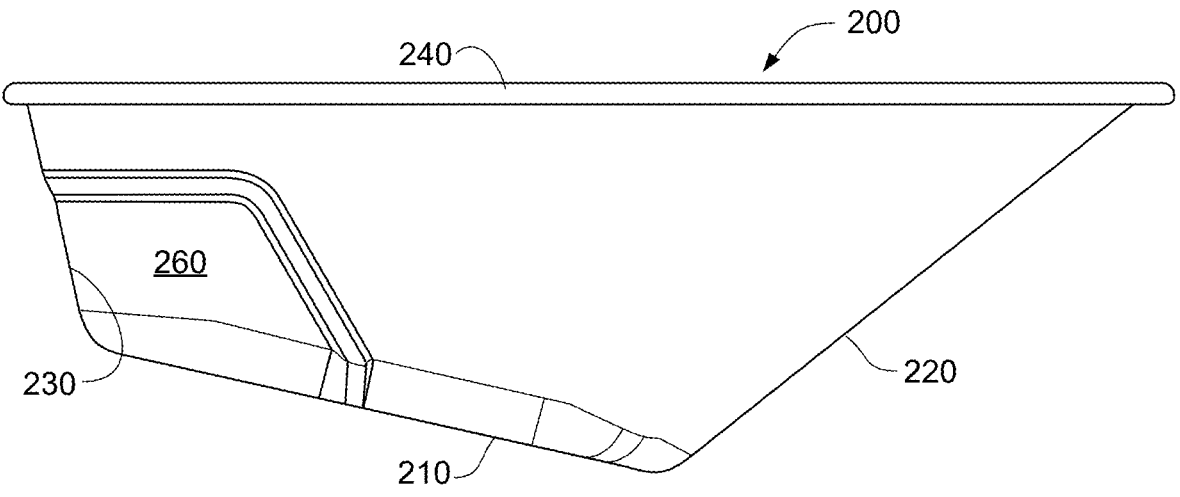
FIG. 12 is a left side elevation view depicting the tub of the wheelbarrow of FIG. 1.
Figures 13, 14:
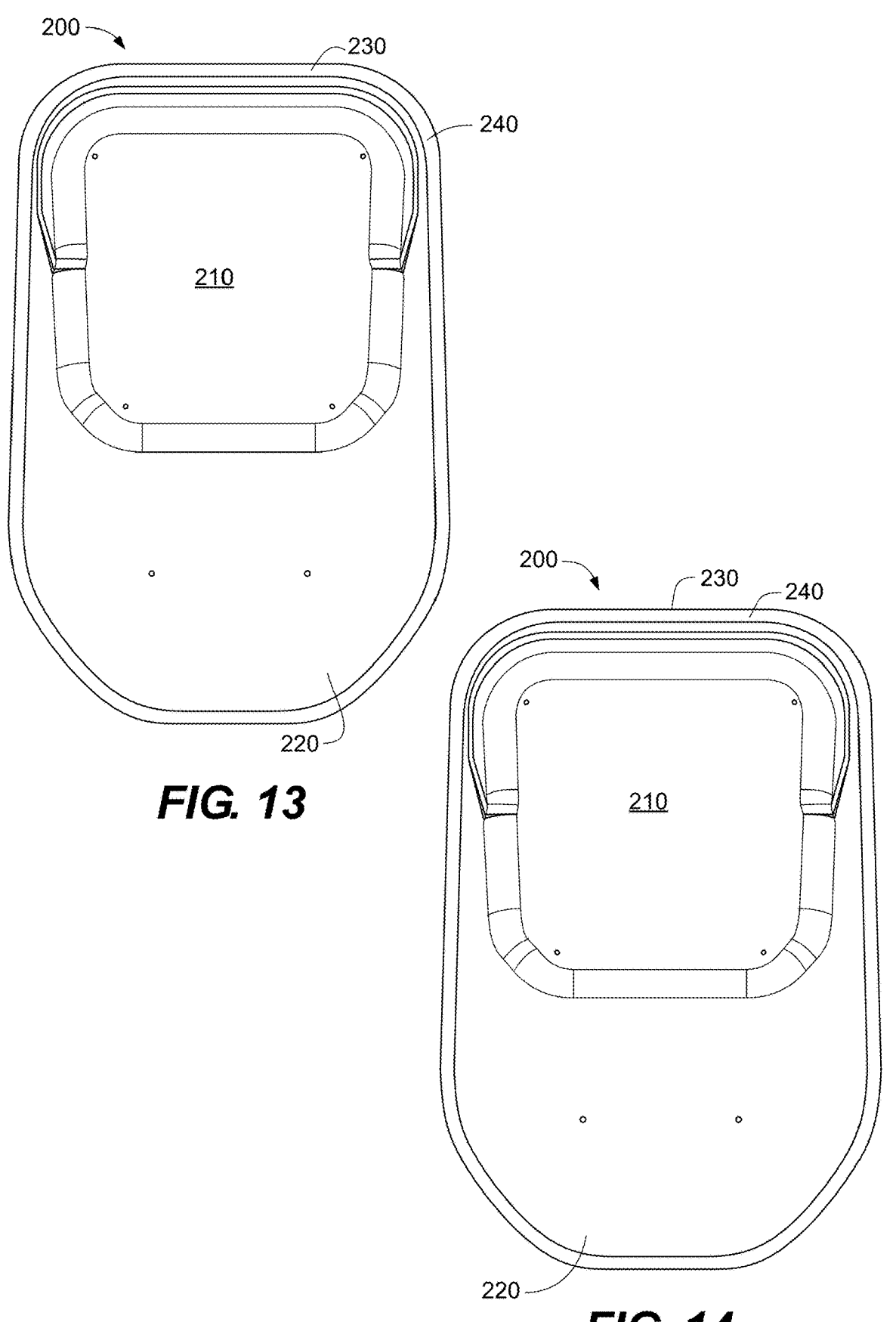
FIG. 13 is a top view depicting the tub of the wheelbarrow of FIG. 1.
FIG. 14 is a bottom view depicting the tub of the wheelbarrow of FIG. 1.
Figure 65:
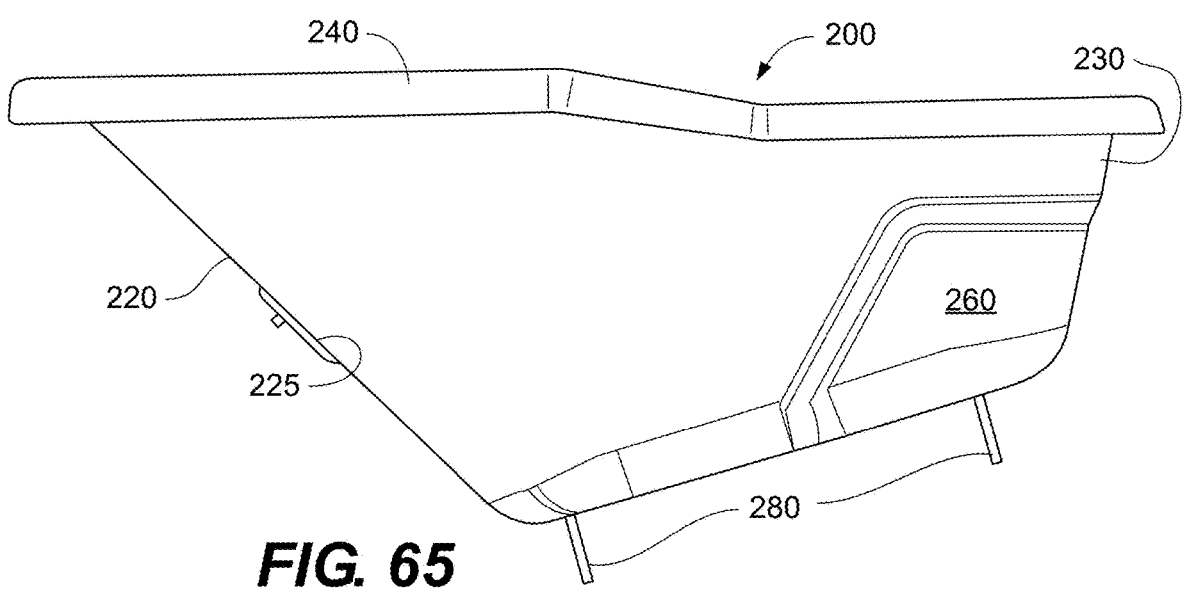
FIG. 65 is a right-side elevation view depicting the tub of the wheelbarrow of FIG. 50 with square head bolts.
Figure 66:
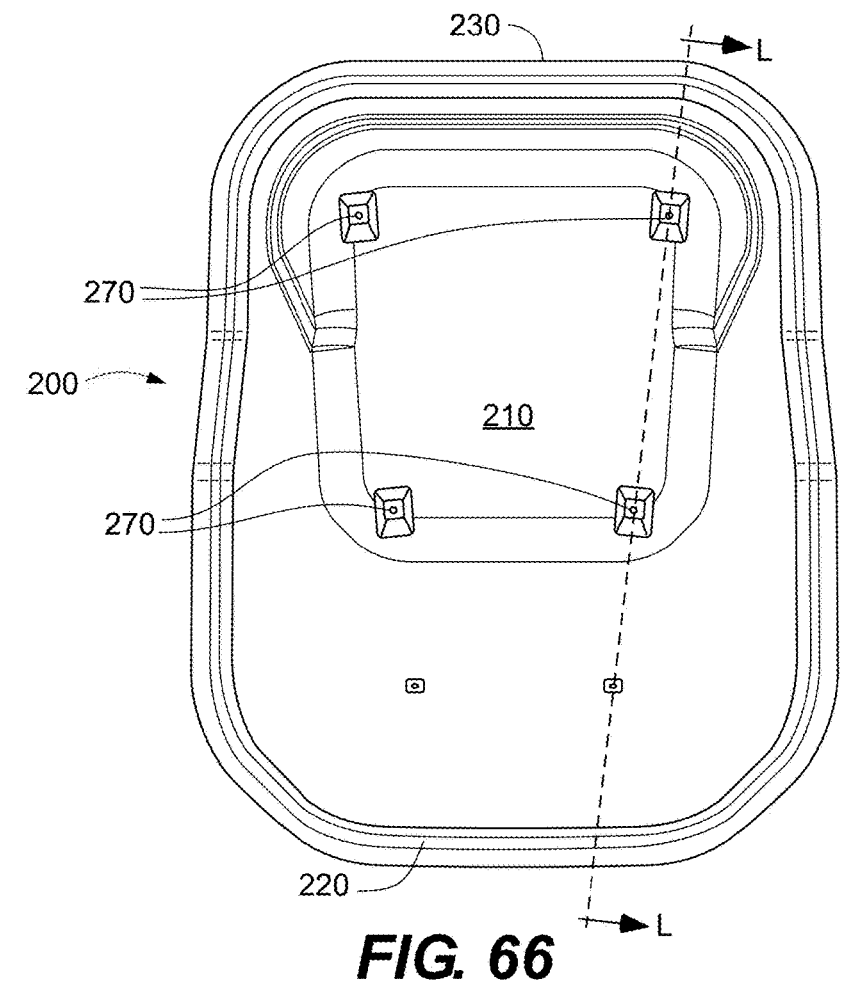
FIG. 66 is a top view depicting the tub of the wheelbarrow of FIG. 50 with square head bolts.
Figure 67:
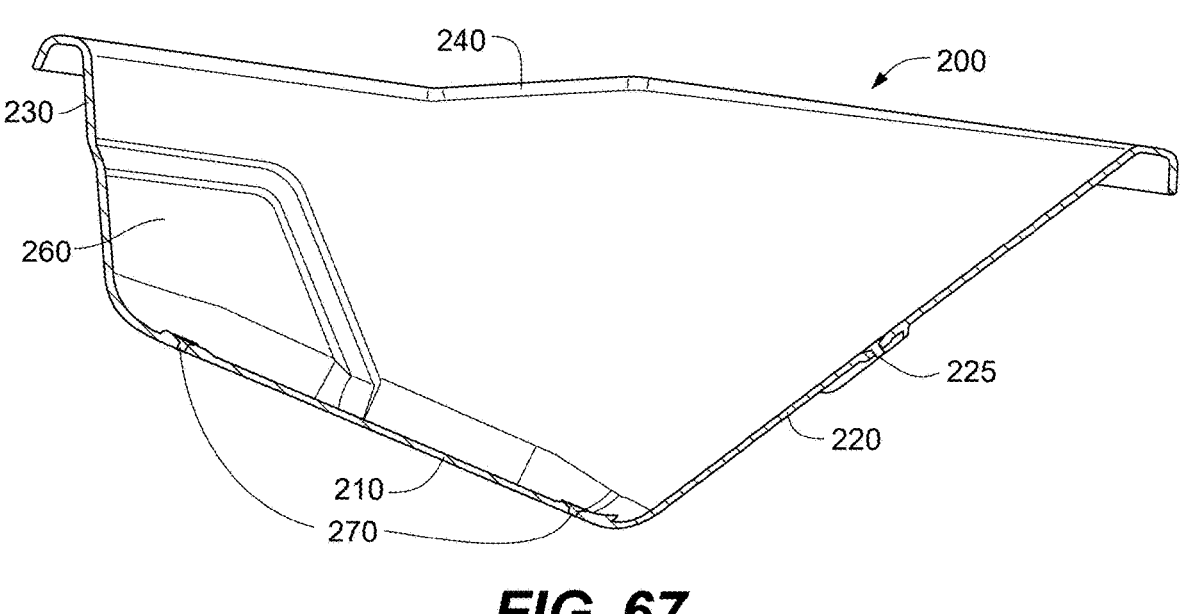
FIG. 67 is a sectional view depicting the tub of the wheelbarrow of FIG. 50 taken along line K-K in FIG. 62.
Figure 68:
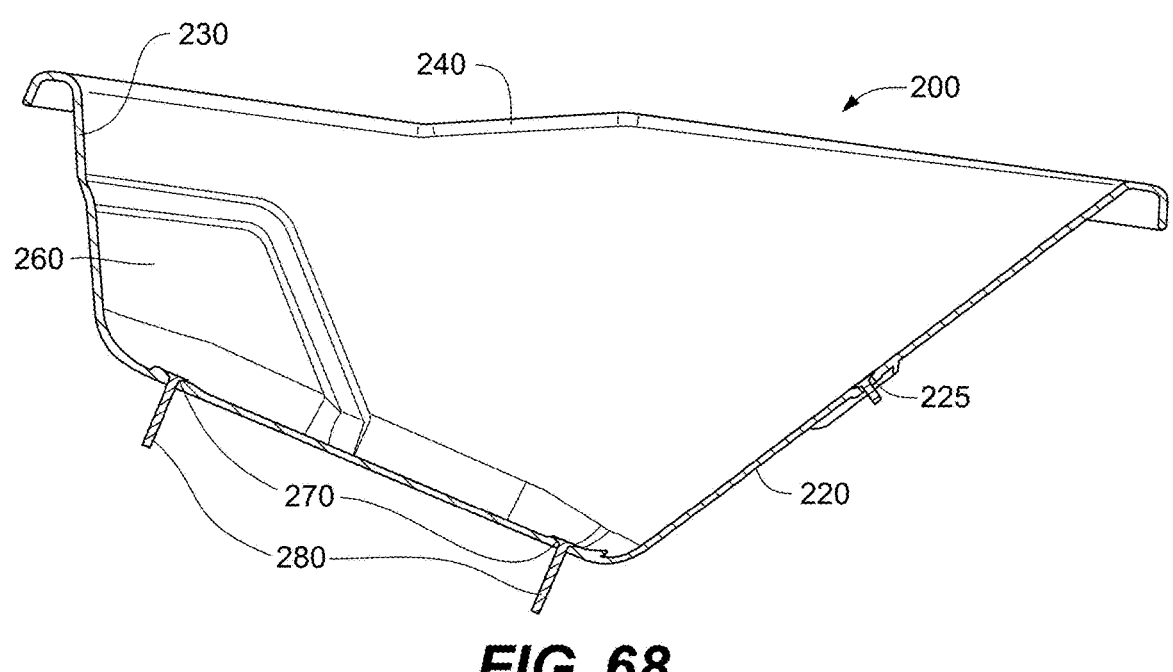
FIG. 68 is a sectional view depicting the tub of the wheelbarrow of FIG. 50 with square head taken along line L-L in FIG. 66.
Figure 69:
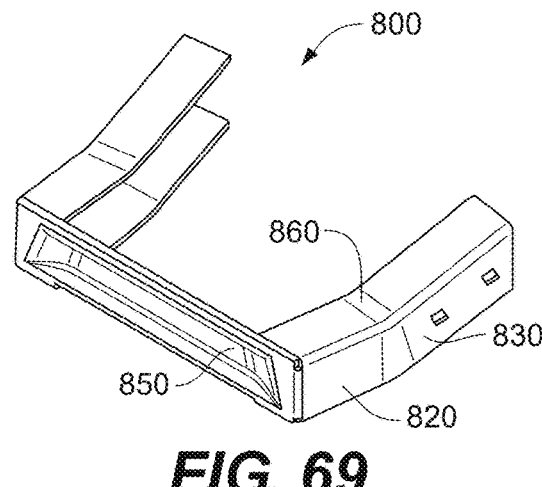
FIG. 69 is a top perspective view depicting the wheel guard of the wheelbarrow of FIG. 50.
Figure 70:
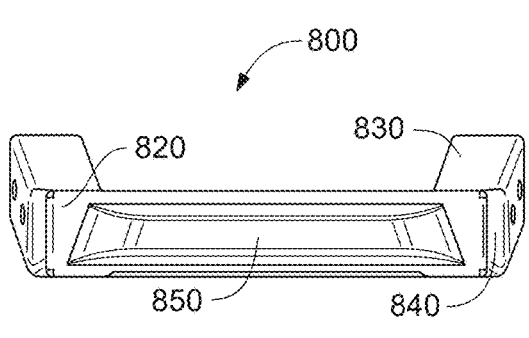
FIG. 70 is a front elevation view depicting the wheel guard of the wheelbarrow of FIG. 50.
Figure 71:
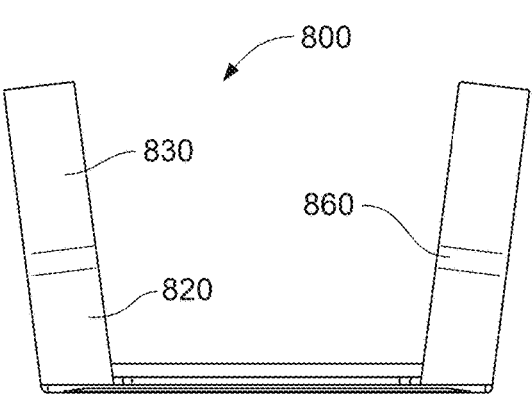
FIG. 71 is a top view depicting the wheel guard of the wheelbarrow of FIG. 50.
Figure 72:
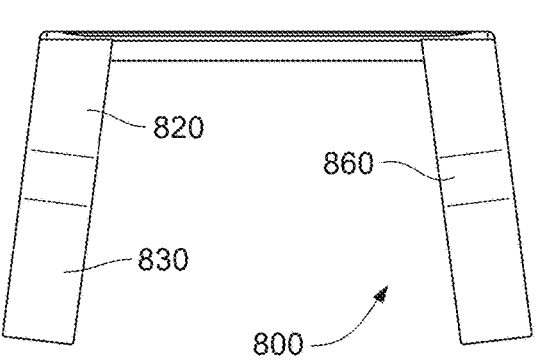
FIG. 72 is a bottom view depicting the wheel guard of the wheelbarrow of FIG. 50.
Figure 73:
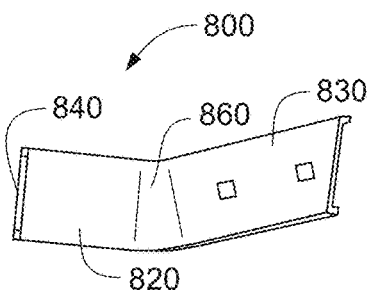
FIG. 73 is a right-side elevation view depicting the wheel guard of the wheelbarrow of FIG. 50.
Figure 74:
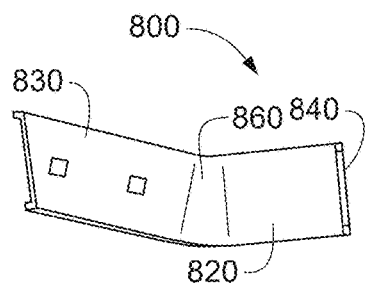
FIG. 74 is a left side elevation view depicting the wheel guard of the wheelbarrow of FIG. 50.
Figures 75, 76:
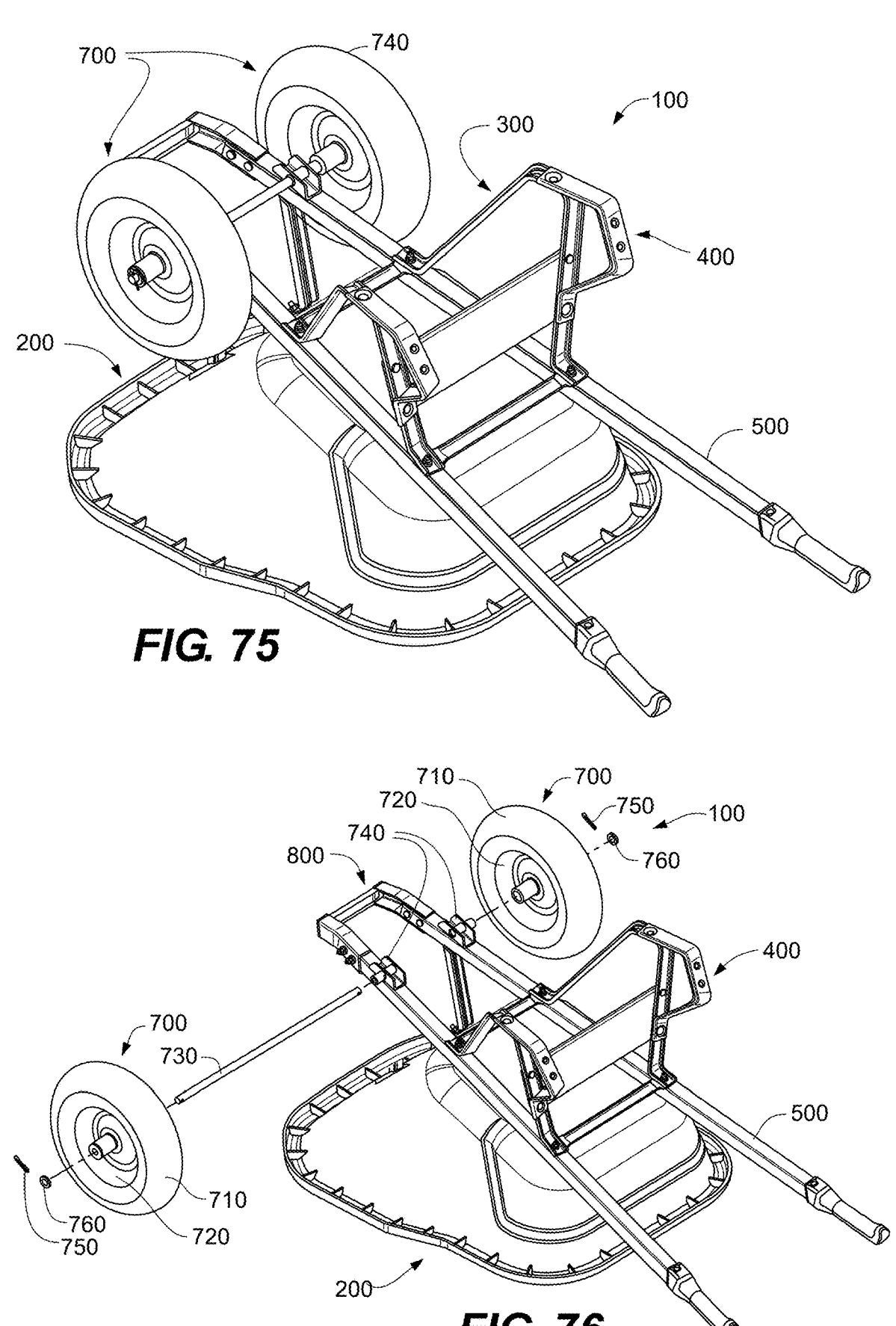
FIG. 75 is a rear perspective view depicting the wheelbarrow of FIG. 50 turned upside down.
FIG. 76 is a rear perspective view depicting the wheelbarrow of FIG. 50 turned upside down with the wheel and connecting parts separated from the wheelbarrow.
Figures 77, 78:
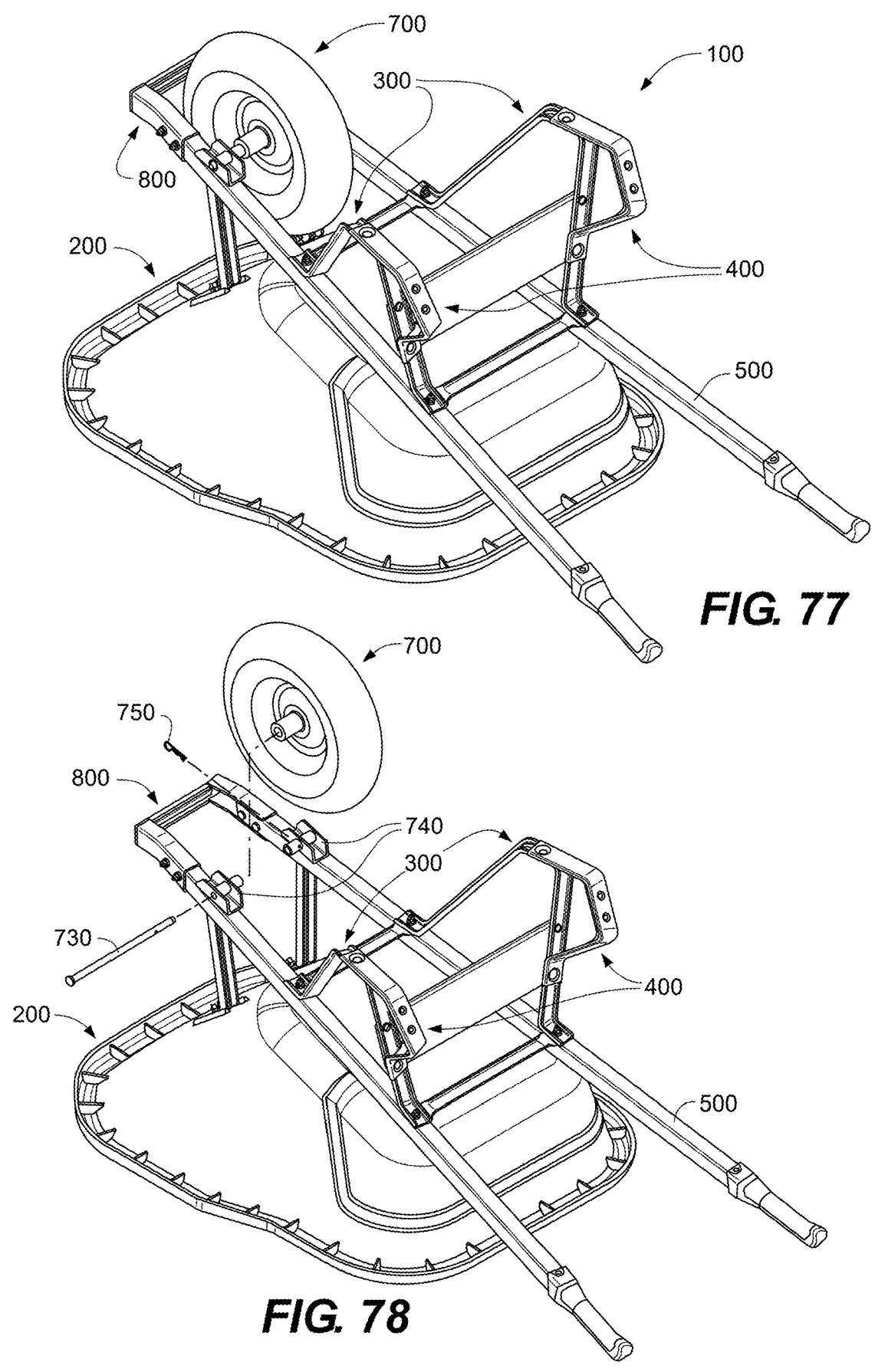
FIG. 77 is a rear perspective view depicting an embodiment of the wheelbarrow of FIG. 50 turned upside down having one wheel.
FIG. 78 is a rear perspective view depicting the wheelbarrow of FIG. 77 turned upside down with the wheel and connecting parts separated from the wheelbarrow.

In addition, as seen in FIGS. 5-6, the leg rear portion 330 is preferably near vertical from the leg bottom portion 310 and is located near the tub rear portion 230 to provide maximum support for any load carried in the wheelbarrow 100. The leg bottom portion 310 is preferably a planar surface that allows it to be in complete contact with a level ground surface. Both the leg front portion 320 and leg rear portion 330 are adapted to connect directly to the handle shaft 500. Preferably, the legs 300 are secured to not only the handle shaft 500, but also to the tub 200 as well as a tub riser 600 (detailed by FIGS. 41-46) by using bolts 280 (FIG. 65). To provide additional stiffening between the pair of legs 300, one or more leg braces 340 can run between the legs 300. The legs 300 and leg braces 340 can be made of any materials known in the field, but are preferably formed from reinforced steel that is produced in a full stamping mold to provide superior strength.

Figures 39, 40:
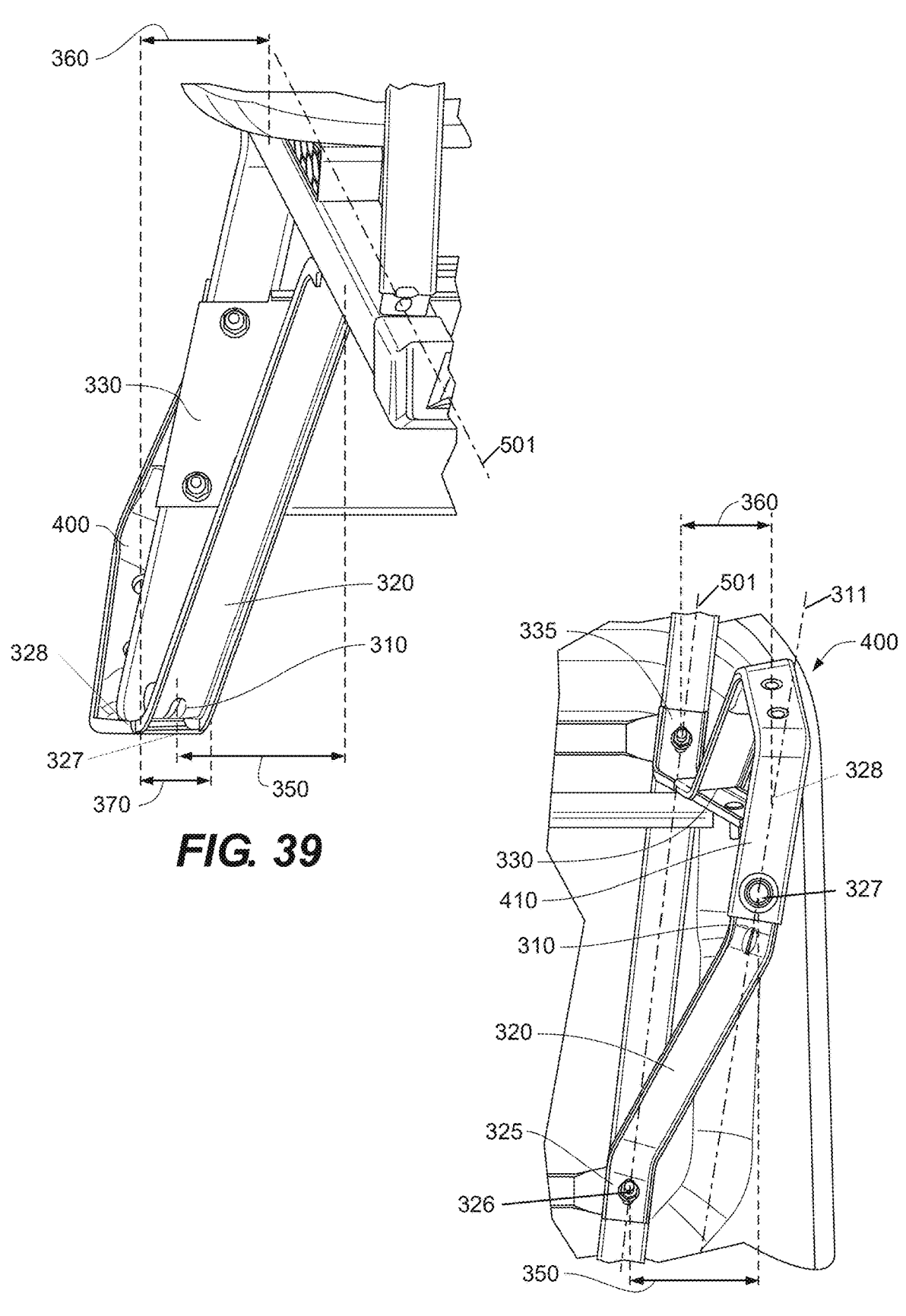
FIG. 39 is a detailed front elevation view depicting the stabilizer of the wheelbarrow of FIG. 1 inside the arc A-A in FIG. 3.
FIG. 40 is a detailed bottom view depicting the stabilizer of the wheelbarrow of FIG. 1 inside the arc E-E in FIG. 8.
Figure 41:
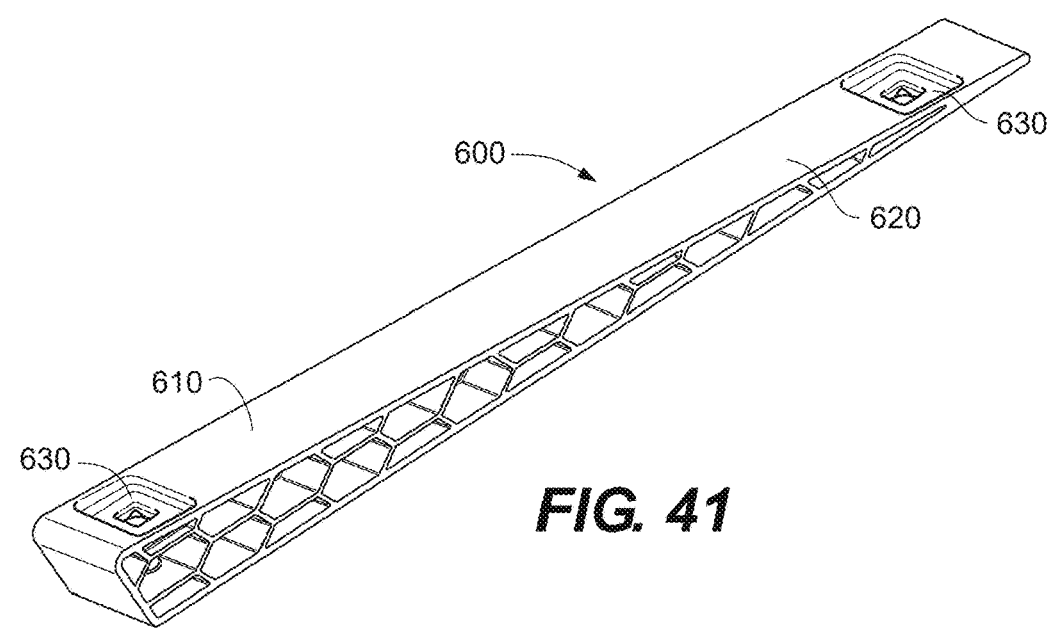
FIG. 41 is top front perspective view depicting the tub riser of the wheelbarrow of FIG. 1.
Figure 42:
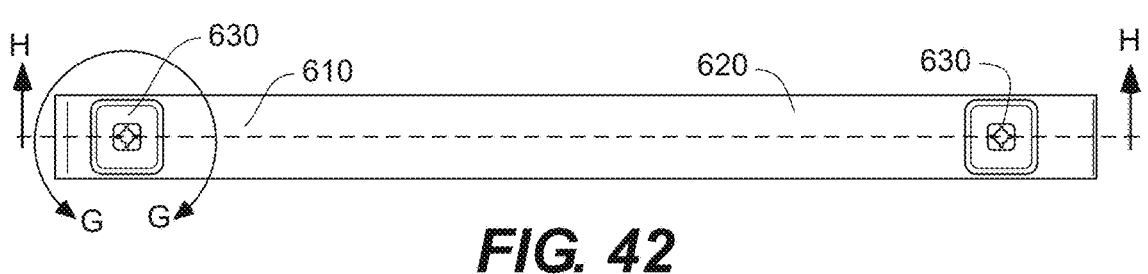
FIG. 42 is a top view depicting the tub riser of the wheelbarrow of FIG. 1.
Figure 43:
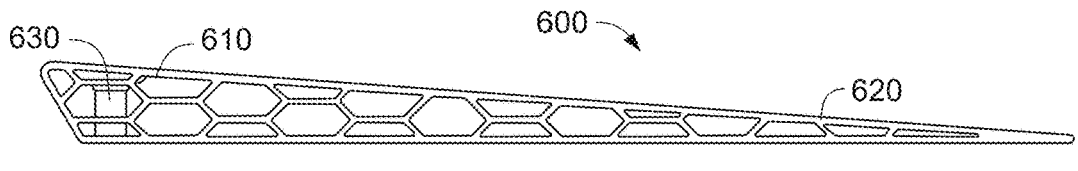
FIG. 43 is a right elevation view depicting the tub riser of the wheelbarrow of FIG. 1.
Figure 44:
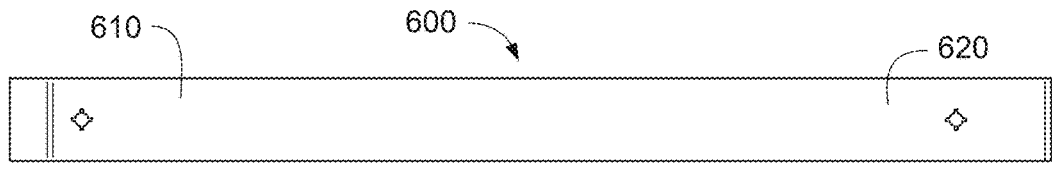
FIG. 44 is a bottom view depicting the tub riser of the wheelbarrow of FIG. 1.

Additional novel aspects of the legs 300 are shown in further detail in FIGS. 39-40. Prior art wheelbarrow legs are configured to maintain the same angle as seen from below as the handle shafts (i.e., the leg bottoms fall within the vertical shadows of the handle shafts). The legs 300 of the present invention provide greater strength and stability over the prior art designs. The novel design of the legs 300 allows the leg bottom portions 310 to flare out from the handle shafts 500, but also allow the leg bottom portions 310 to be coplanar with a level ground surface. This flare provides improved stability by widening the spread of the legs 300 while also allowing more of the leg bottom portions 310 to contact a level ground surface when in a resting position.

As illustrated by FIGS. 39-40, the design of the present invention provides a leg front offset 350 (horizontal distance between the handle shaft center line 501 at the location 326 of connection of the leg front tab 325 to the handle shaft 500 and the leg bottom center line 311 at the junction 327 of the connection of the leg front portion 330 and leg bottom portion 310) as well as a leg rear offset 360 (horizontal distance between the handle shaft center line 501 at the point of connection of the leg rear tab 335 to the handle shaft 500 and the leg bottom center line 311 at the junction 328 of the connection of the leg rear portion 330 and leg bottom portion 310). These offsets 350, 360 are preferably at least the width of the handle shafts 500 at the point where the legs 300 are attached to the handle shafts 500, but preferably do not extend the footprint of the legs 300 beyond the tub upper rim 240.

FIGS. 26-32 illustrate another embodiment of the wheelbarrow 100 regarding to a stabilizer 400. The stabilizer 400 acts to stiffen and provide support for the leg rear portion 330 and to provide an extension of flat surface for ground contact. As with the legs 300, the stabilizers 400 are formed to follow the contour of the legs 300 and connect to the legs 300 via any means known in the field including welding, riveting, or press-fitted parts; however, the preferred embodiment contemplates nuts 290 and bolts 280 to allow for assembly or disassembly of the wheelbarrow 100 for repair or parts replacement. The preferred embodiment of the stabilizer 400 includes a bottom portion 410, an upright portion, 420, a top portion 450, a top tab 455 and a width 470. A preferred embodiment includes a stabilizer bottom exterior angle 460 between the bottom portion 410 and upright portion 420 of at least 30 degrees to allow a user to easily grasp the stabilizer 400 and manipulate the wheelbarrow 100. Top tab 455 and top portion 450 are noncolinear and form a stabilizer upper exterior angle 451 and top portion and bottom portion are noncolinear and form a stabilizer middle interior angle 421. As with the legs 300, it is preferable that the stabilizer be constructed as a unibody structure of reinforced steel that is produced in a full stamping mold to provide exceptional strength and durability. However, it is understood that the stabilizer can be made of any materials known in art. The preferred embodiment contemplates the stabilizer bottom portion 410 being sized to accommodate the leg bottom portion 310 to provide additional strength and stability by the sistering of the two parts in addition to the use of bolts 280 and nuts 290 to connect the parts. Strength and stability are further provided by sizing the stabilizer top tab 455 to accept the leg rear portion 330.

Figures 31, 32:
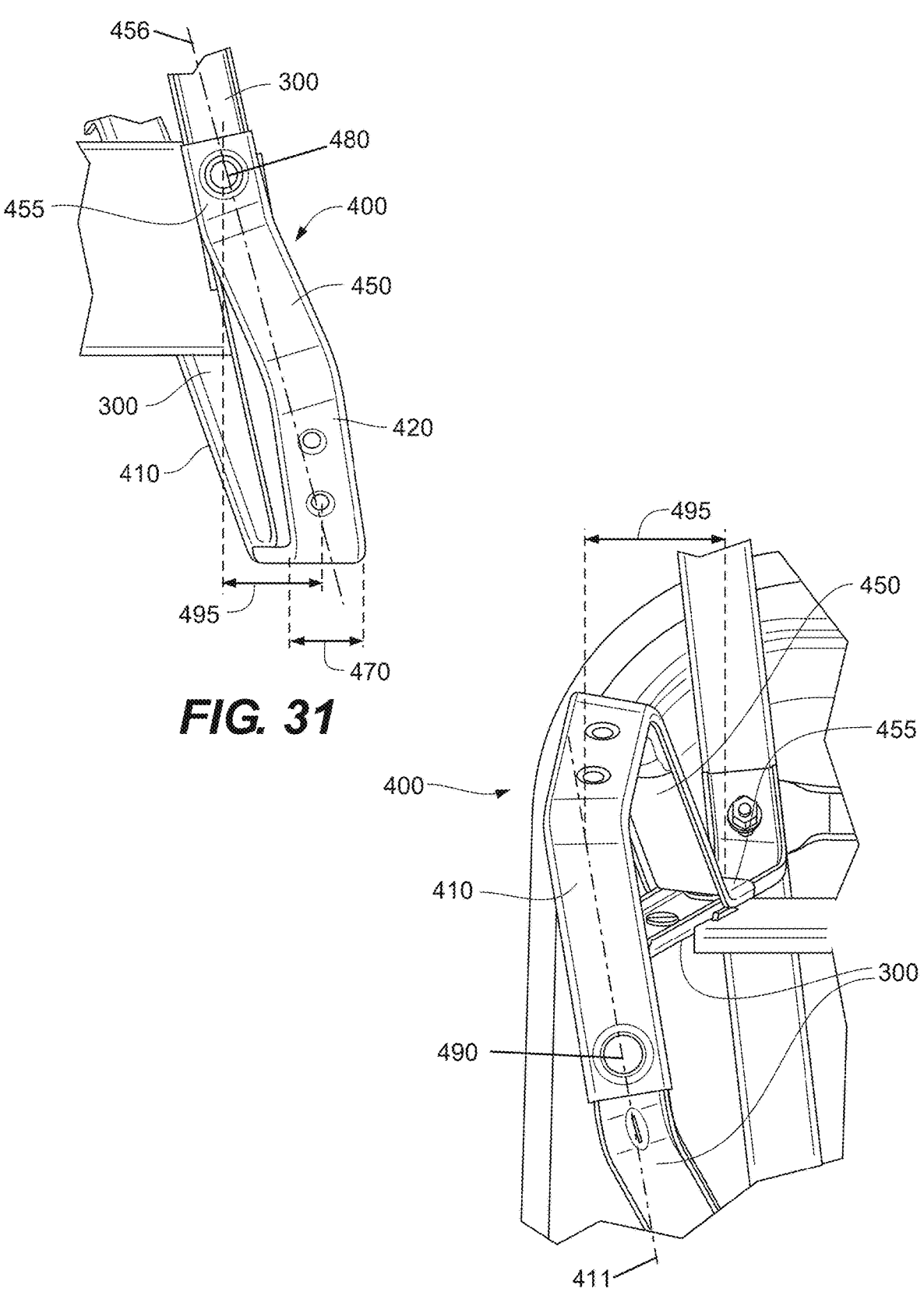
FIG. 31 is a detailed rear elevation view depicting the stabilizer of the wheelbarrow of FIG. 1 inside the arc B-B in FIG. 4.
FIG. 32 is a detailed bottom view depicting the stabilizer of the wheelbarrow of FIG. 1 inside the arc D-D in FIG. 8.
Figure 33:
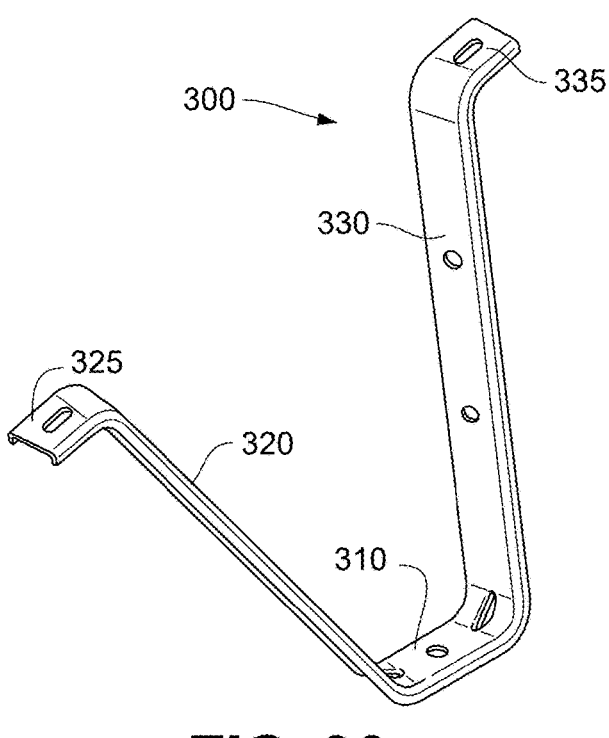
FIG. 33 is a front right perspective view depicting the leg of the wheelbarrow of FIG. 1.
Figure 34:
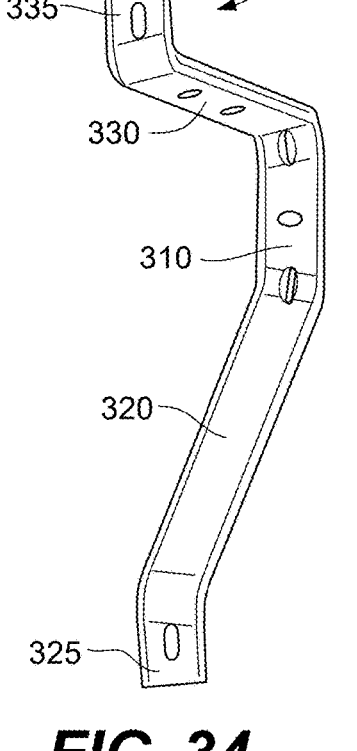
FIG. 34 is a top view depicting the leg of the wheelbarrow of FIG. 1.
Figure 35:
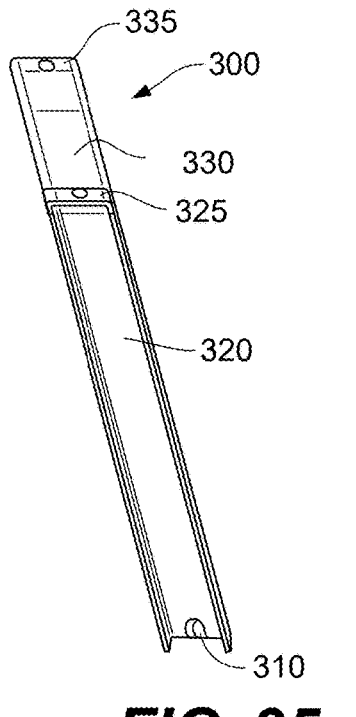
FIG. 35 is a front elevation view depicting the leg of the wheelbarrow of FIG. 1.
Figure 36:
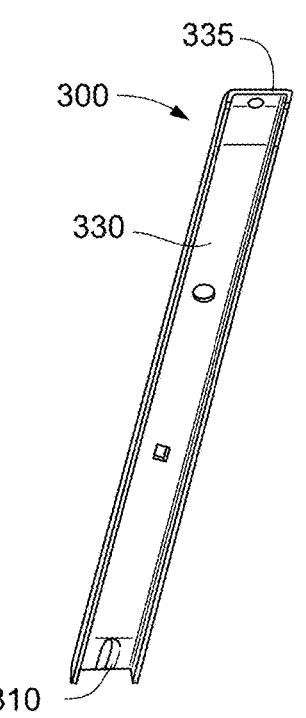
FIG. 36 is a rear elevation view depicting the leg of the wheelbarrow of FIG. 1.
Figure 37:
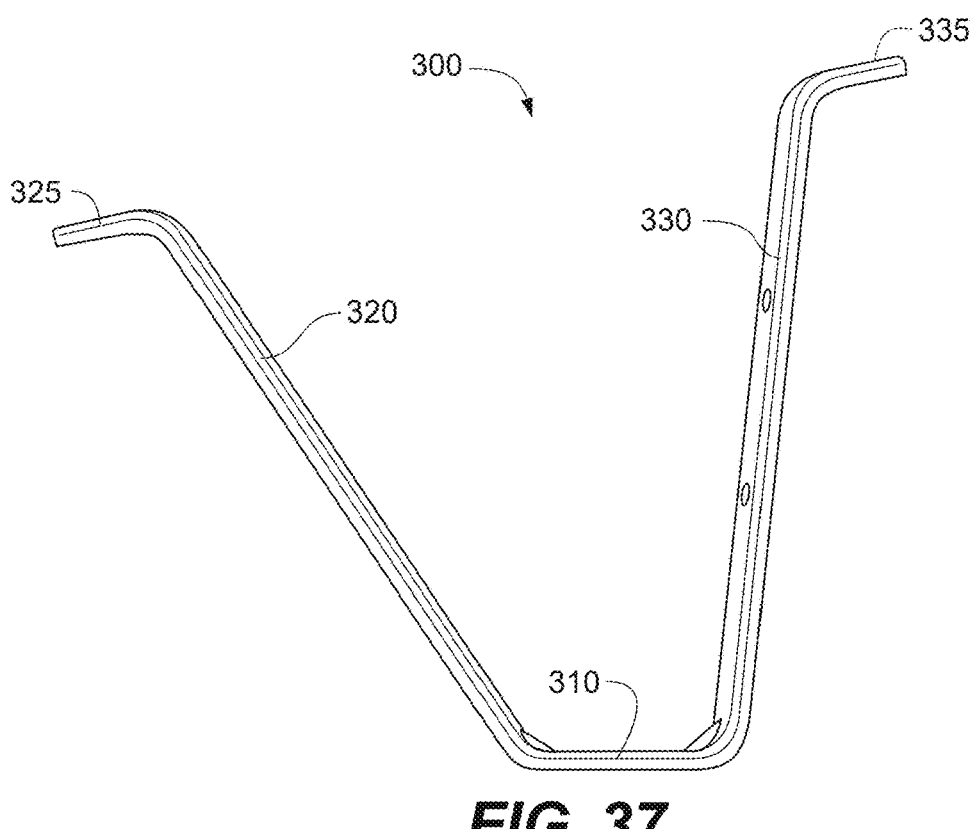
FIG. 37 is a right elevation view depicting the leg of the wheelbarrow of FIG. 1.
Figure 38:
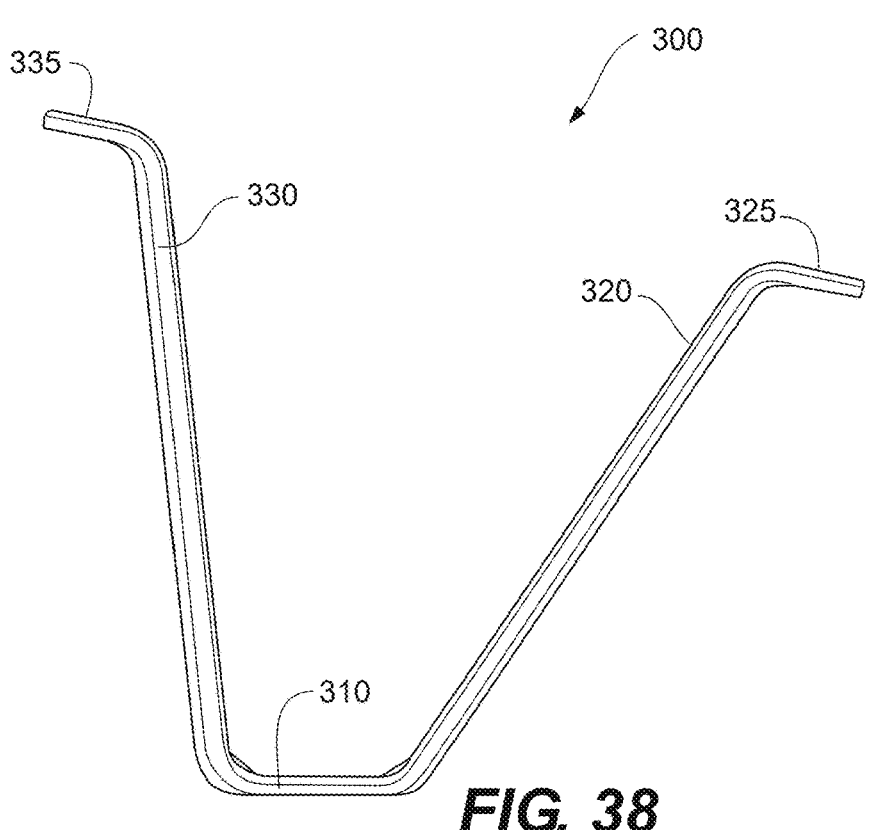
FIG. 38 is a left elevation view depicting the leg of the wheelbarrow of FIG. 1.

As illustrated by FIGS. 31-32, the design of the present invention also provides a stabilizer offset 495 (horizontal distance between the stabilizer top portion center line 456 at the location 480 of connection between the stabilizer top tab 455 and leg rear portion 330 and the stabilizer bottom portion center line 411 at the location 490 of connection between the stabilizer bottom portion 410 and the leg bottom portion 310). The stabilizer offset 495 is preferably at least the cross-sectional width of the stabilizer 470. The stabilizer offset 495 allows for the leg stabilizer bottom 410 to continue to flare out and extend the footprint of the wheelbarrow 100 while allowing the stabilizer bottom portion 410 to be parallel with the leg bottom portion 310 and maintain complete contact with a level ground surface.

The stamp molding of legs 300 and stabilizers 400 allows for precise alignment and fitting of the two parts to allow them to be aligned and affixed to handle shafts 500 while provided a wide leg 300 stance of about the same width as the tub 200 at the tub rear portion 230 while not interfering with clearance or a user moving around the wheelbarrow 100.

Another novel feature of the stabilizer 400 is the addition of a stabilizer upright portion 420 that provides a means of handling the wheelbarrow 100 not found in prior art wheelbarrows. The stabilizer upright portion 420 is arranged and sized to accommodate four gloved fingers of a human adult grasping the stabilizer upright portion 420. Another related improvement to the stabilizer 400 is the addition of a stabilizer grip 430 on the stabilizer upright portion 420. These improvements allow a user to comfortably grasp the stabilizer 400 for either lifting or dumping the wheelbarrow 100.

The stabilizer grip 430 can be made of any material known in the art, but is preferably a firm plastic, and attached to the stabilizer 400 by any means known in the field, but the preferred method is use of rivets 440. Specifically, semi-tubular rivets 440 are considered the best mode of connection. The stabilizer grip 430 is contoured to provide a comfortable surface for the user to lift, move, dump, or otherwise manipulate the wheelbarrow 100 and sized to fit within the structure of the stabilizer 430. The preferred embodiment has the stabilizer grip 430 extend partly along the stabilizer bottom portion 410 and stabilizer top portion 450 to provide additional comfort to a user.

FIGS. 22-25 present another embodiment of the wheelbarrow 100 that allows the convenient use of a single wheel 700 (FIG. 22-23) or two front wheels 700 (FIG. 24-25) with a simple change in the axle 730. It is understood that the axle 730 for the two wheel 700 embodiment will be necessarily longer than the axle 730 of a single wheel embodiment. In either arrangement, axle mounts 740 are attached to each handle shaft 500 that accept an axle 730 to which a single wheel or two wheels 700 can be mounted. At least one of the axle mounts 740 also includes an axle mount slot 745. It is preferable that each wheel 700 include a rim 720 and a tire 710, the rim configured to mount on the axle 730. The tire 710 can be of any type known in the art including solid, tubed, or tubeless. The disclosed embodiments present a single wheel 700 being mounted between the axle mounts 740 or dual wheels 700 being mounted outside the axle mounts 740. With the single wheel 700 configuration (FIG. 22-23), the axle 730 is of a length to span between the two axle mounts 740 with one end of the axle having a knob 770 to hold the axle against one of the axle mounts 740 and allowing a single pin 750 through an axle orifice 780 (FIG. 23) to secure the axle 730 to the wheelbarrow 100 at the other axle mount. There is also the option of having the pin 750 also go through an axle mount slot 745 (FIG. 23) to assist in keeping the axle 740 secured to the wheelbarrow 100. In the dual wheel 700 configuration (FIG. 24-25) the axle 730 is of a length to span between the outside of the rims 720 and allow washers 760 and pins 750 to secure the wheels 700 onto the axle 730. To change from one configuration to the other requires simply removing a single pin 750 and changing the axle 730 to use two pins 750. Alternatively, this configuration can be accomplished using an axle 730 similar to the one-wheel configuration that has a knob 770 at one end, which then requires only a single axle orifice 780 and pin 750 to secure the axle 730 to the wheelbarrow 100. While any pin 750 will suffice to hold the wheel(s) 700 on the axle 730, the preferred pin 750 is an "R-type" that does not require tools to pull for a change in wheel 700 configurations. While the preferred pin 750 of an "R-type," and others known in the art such as cotter pins, hitch pins, clevis pins, or lynch pins will also suffice.

Figure 45:
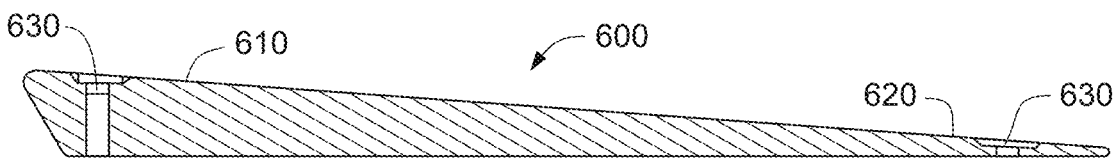
FIG. 45 is a sectional view depicting the tub riser of FIG. 1 taken along line H-H in FIG. 42.
Figure 46:
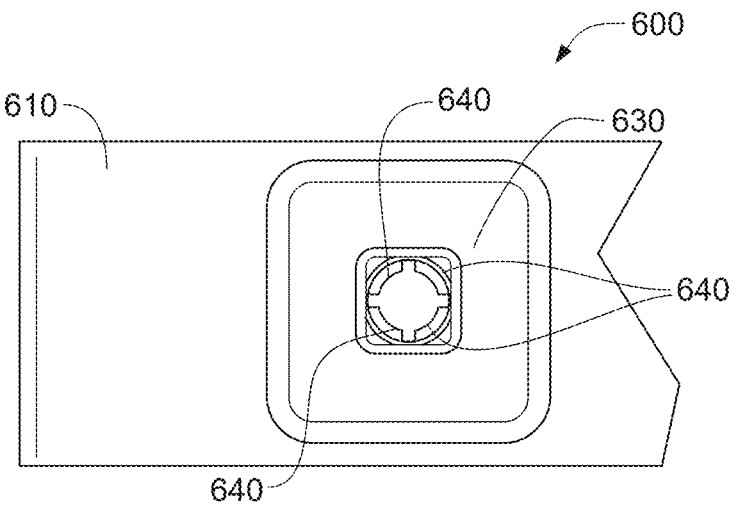
FIG. 46 is a detailed top view depicting the tub riser of the wheelbarrow of FIG. 1 inside the arc G-G in FIG. 42.

FIGS. 41-46 provide detailed views of another embodiment of the wheelbarrow 100 related to a tub riser 600. The tub riser 600 allows the tub 200 to sit at the desired angle when the wheelbarrow 100 is in either a resting position or transporting position. The tub riser 600 also acts to cushion the tub 200 from the handle shafts 500, which in turn extends the life of the tub 200. The tub riser 600 is preferable wedge shaped, being taller in the front portion 610 than the rear portion 620. The tub riser 600 is preferably made of molded plastic with a honeycomb structure to lessen the weight of the component while providing more cushioning of the tub 200. The tub riser 600 may also include indents 630 sized and configured to accept either a corresponding structure on the tub bottom 210 or to accommodate the shoulder of carriage bolt 280. As best seen in FIGS. 45-46, the tub riser 600 includes bolt retaining tabs 640 designed to grasp the threads of a bolt 280 to facilitate assembly of the wheelbarrow 100, especially when doing so with the wheelbarrow 100 upside down.

The present invention also contemplates different tub 200 designs to provide distinct features. One embodiment of the tub is presented in FIGS. 9-14. The tub 200 includes a bottom 210, front portion 220, rear portion 230, upper rim 240, and insert 260. The tub 200 of this embodiment is of formed steel for carrying heavier loads and loads that are not acceptable for use with plastic tubs. The embodiment of the steel tub 200 is smaller than the second (to be discussed) embodiment with a plastic tub 200. Due to the size and configuration of the embodiment with a steel tub 200, the plastic riser 600 allows the steel tub 200 to be at the optimal position (FIGS. 1-8) on the wheelbarrow 100 for the various positions during use (FIGS. 791-*d*).

A second embodiment of the wheelbarrow 100 (FIGS. 58-68) utilizes a tub 100 molded of plastic that is lighter and larger than the embodiment with a steel tub 200. The plastic tub 200 includes a bottom 210, front portion 220, rear portion 230, upper rim 240, ribs 250, and insert 260. The lighter weight of this version of the tub 200 decreases the overall weight of the wheelbarrow 100 at the expense of being limited in the materials it can carry (i.e., embers or metal pieces too hot for plastic). This embodiment of the tub 200 also utilizes an upper rim 240 that is substantially parallel to the ground surface when the wheelbarrow 100 is in a resting (FIG. 79*a*) or transporting position (FIG. 79*b*). This is accomplished by having an approximate five-degree slope of the upper rim 240 from the tub front portion 220 down to the tub rear portion 230. When in the resting position. The wheelbarrow 100 is configured so that the upper rim 240 will slope at approximately five degrees from the tub rear portion 230 down to the tub rear portion in the transporting position for an average adult user. Because this embodiment has a larger tub 200 that can be more easily formed than steel, a tub riser 600 is unnecessary.

Another embodiment disclosed in FIGS. 58-68 is the use of square head bolt recesses 270 in the tub bottom 210 that accommodate square head bolts 280 for securing the tub 200 to the handle shafts 500. These recesses 270 are sized to allow the head of the bolts 280 to be recessed into the tub bottom 210 so the head is flush with the surface of the tub bottom to prevent material or tools from catching on bolt heads that are typically used in the prior art. Another benefit of the recesses 270 is that they are configured to keep the square head bolts 280 from rotating during assembly of the wheelbarrow 100. Other types of bolts tend to rotate while tightening their respective bolts, making assembly difficult.

Figures 62, 63, 64:
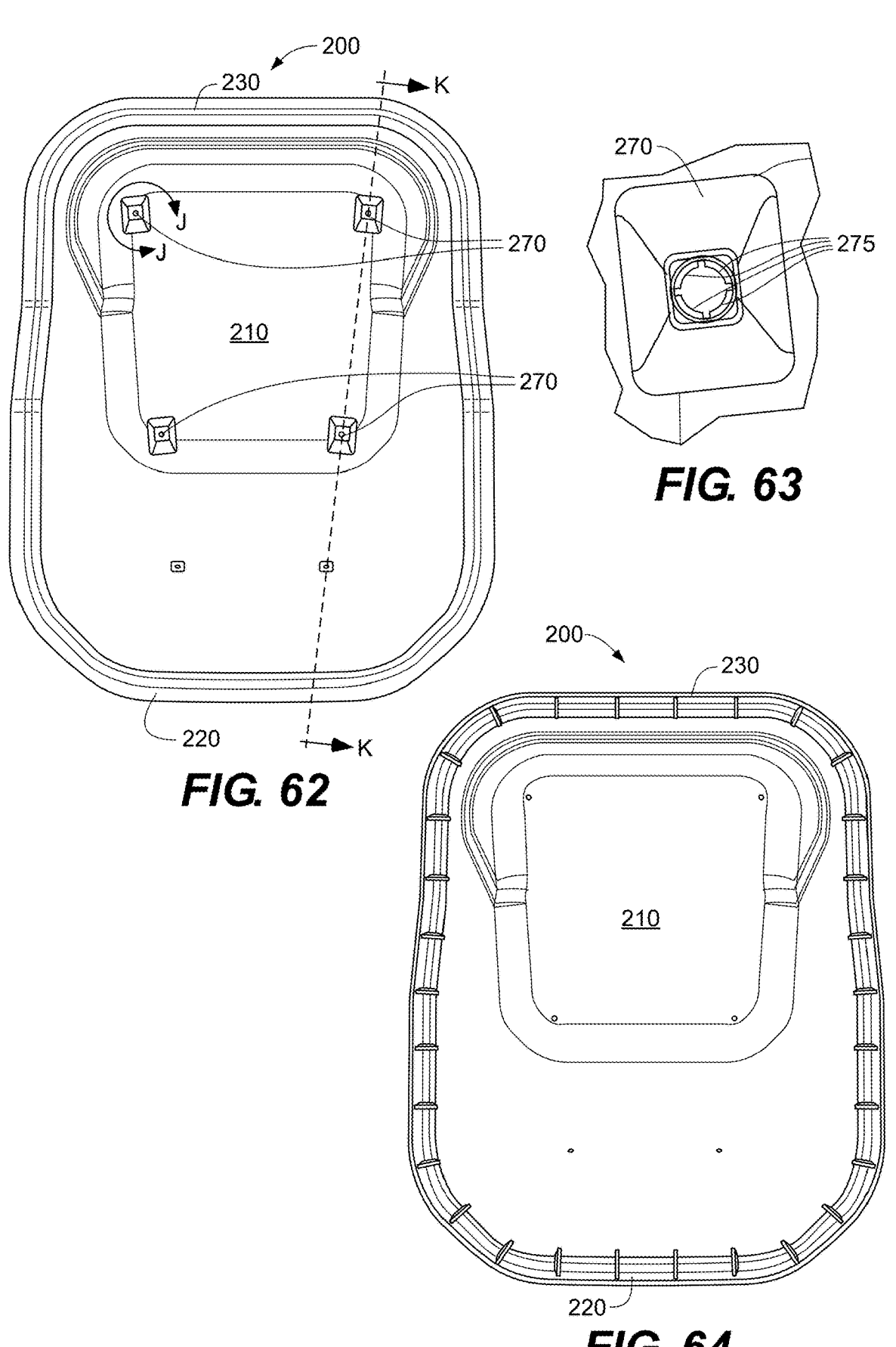
FIG. 62 is a top view depicting the tub of the wheelbarrow of FIG. 50.
FIG. 63 is a detailed view depicting the tub of FIG. 50 taken inside the arc J-J in FIG. 62.
FIG. 64 is a bottom view depicting the tub of the wheelbarrow of FIG. 50.

Another novel aspect of the tub 200 that is seen in FIG. 63 is the use of a bolt retaining tab 275 similar to those found on the tub riser 600 discussed above. It is preferable to have formed in each aperture through the tub 200 bolt retaining tabs 275. These tabs 275 are preferably a piece of the plastic material used to form the tub 200 that remains in the aperture during the molding process. Ideally, the tabs 275 are sized to grasp the threads of the bolt 280 within the aperture during assembly of the wheelbarrow 100 without interfering with the tightening of the bolt 280.

Another embodiment of the wheelbarrow 100 provides additional support for the tub 200 via tub braces 520 extending from the handle shaft 500 to the tub front portion 220. The tub braces 520 are preferably made of reinforced steel and connected to the tub front portion 220 and to the handle shafts 500 using a bolt 280 and nut 290. However, these connections can be accomplished by any means known in the field, such as rivets, adhesive, welding, etc. The tub 200 can be formed with tub brace inserts 225 that facilitate assembly of the wheelbarrow 100 and provide additional strength and stability of the connection between the tub 200 and tub braces 520.

Another embodiment of the present invention that acts to provide a superior stiffness to the wheelbarrow 100 is the joining of multiple components at the same point of connection, using the same connector method for all the components. Referring to FIGS. 1-8, one embodiment contemplates the connection of the leg rear portion 330, leg brace 340, and stabilizer top portion 450 with a single bolt 280 and nut 290. Further, the tub bottom 210, tub riser 600, handle shaft 500, leg rear portion 330, and handle brace 510 can all connected together by a single square head bolt 280 and nut 290 toward tub rear portion 230. Likewise, the tub bottom 210, tub riser 600, handle shaft 500, leg front portion 320, and handle brace 510 can all be connected by a single bolt 280 and nut 290. Another preferred embodiment of this arrangement contemplates the tub brace 520, handle shaft 530, and axle mount 740 being connected by one bolt 280 through all three parts.

The improved functionality of the disclosed wheelbarrow 500 is illustrated by FIGS. 79*a*-*d*. The distance L1 of the handle shaft 500 to the point of rotation O (axle 730) in relation to the distance L2 from the center of mass for a carried load 110 to the point of rotation and the height H1 of the center of mass for a carried load 110 results in approximately 5.8 percent less work compared to prior art wheelbarrows. This disclosed configuration along with the improved design of the wheel guard 800 also results in the less raising of the center of mass for a carried load 110 to dump a carried load, resulting in 11.4 percent less work compared to that required for prior art wheelbarrows.

The typical prior art wheel guard 800 being linear with the handle shaft 500 results in the wheel guard 800 touching the ground surface 900 sooner than with the present invention. At that point, the center of mass for a carried load 110 has yet to reach the point of rotation O with the prior art wheelbarrow 100. However, as can be seen in FIG. 79*c*, when the wheel guard makes contact with the ground surface 900, the center of mass for the carried load 110 has passed the point of rotation O. Once the center of mass for a carried load 110 has reached the point of rotation O, no further work is required with the present invention because gravity does the remainder of the work. The design of the disclosed wheel guard 800 also improves functionality by allowing the wheelbarrow 100 to rotate more during dumping before interfering with rotation, resulting in a smother dumping movement (i.e., the wheelguard does not interfere with the momentum of the dump movement). At that point (FIG. 79*c*), the point of rotation O moves from the axle 730 to the front of the wheel guard 800.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A stabilizer for a wheelbarrow, comprising:
   a stabilizer bottom portion having a center line, the stabilizer bottom affixed to a leg of the wheelbarrow;
   a stabilizer top tab having a center line, the stabilizer top tab affixed to the leg of the wheelbarrow;
   a stabilizer upright portion extending from the stabilizer bottom portion; and
   a stabilizer top portion extending between the stabilizer top tab and the stabilizer upright portion:
   wherein the stabilizer top tab is angled relative to the stabilizer top portion thereby defining a stabilizer upper exterior angle, the stabilizer top portion is angled relative to the stabilizer upright portion thereby defining a stabilizer middle interior angle, and the stabilizer upright portion is angled relative to the stabilizer bottom portion thereby defining a stabilizer bottom exterior angle.

2. The stabilizer for a wheelbarrow of claim 1 wherein the stabilizer bottom exterior angle is greater than 30 degrees and less than 80 degrees.

3. The stabilizer for a wheelbarrow of claim 1 wherein the leg comprises a bottom portion having a center line and wherein the leg bottom portion center line and stabilizer bottom portion center line are parallel to each other.

4. The stabilizer for a wheelbarrow of claim 2 wherein the leg comprises a bottom portion having a center line and wherein the leg bottom portion center line and stabilizer bottom portion center line are parallel to each other.

5. The stabilizer for a wheelbarrow of claim 1 wherein the distance between the location where the stabilizer top tab center line intersects the leg and the location where the stabilizer bottom portion center line intersects the leg defines a stabilizer offset.

6. The stabilizer for a wheelbarrow of claim 5 wherein the stabilizer further comprises a width and the stabilizer offset is greater than the stabilizer width.

7. The stabilizer for a wheelbarrow of claim 1 further comprising a stabilizer grip.

8. The stabilizer for a wheelbarrow of claim 7 wherein the stabilizer grip is comprised of plastic.

9. The stabilizer for a wheelbarrow of claim 7 wherein the stabilizer grip is attached to the stabilizer upright portion.

10. The stabilizer for a wheelbarrow of claim 9 wherein the stabilizer grip is attached to the stabilizer upright portion by a rivet.

11. The stabilizer for a wheelbarrow of claim 9 wherein the stabilizer grip extends at least partly along the stabilizer top portion.

12. The stabilizer for a wheelbarrow of claim 10 wherein the stabilizer grip extends at least partly along the stabilizer bottom portion.

13. The stabilizer for a wheelbarrow of claim 7 wherein the stabilizer grip extends at least partly along the stabilizer top portion and at least partly along the stabilizer bottom portion.

14. The stabilizer for a wheelbarrow of claim 13 wherein the stabilizer grip is comprised of plastic.

15. The stabilizer for a wheelbarrow of claim 1 wherein the leg is attached to the stabilizer top tab and stabilizer bottom portion with a nut and bolt.

16. The stabilizer for a wheelbarrow of claim 1 wherein the leg is attached to the stabilizer top tab and stabilizer bottom portion via welding.

17. The stabilizer of claim 1 wherein the stabilizer is formed of a single piece of metal.

18. The stabilizer of claim 1 wherein the stabilizer middle interior angle is obtuse.

19. A stabilizer for a wheelbarrow, comprising:
   a stabilizer bottom portion, the stabilizer bottom affixed to a leg of the wheelbarrow;
   a stabilizer top tab, the stabilizer top tab affixed to the leg of the wheelbarrow;
   a stabilizer upright portion extending from the stabilizer bottom portion;
   a stabilizer top portion intermediate of the stabilizer top tab and the stabilizer upright portion; and
   wherein the stabilizer top tab and the stabilizer top portion define a stabilizer upper exterior angle, the stabilizer upper exterior angle being greater than 90 degrees and the stabilizer top portion and the stabilizer upright portion define a stabilizer middle interior angle.

20. A stabilizer for a wheelbarrow, comprising:
   a stabilizer bottom portion having a center line and a width, the stabilizer bottom affixed to a leg of the wheelbarrow at a first location on the leg;
   a stabilizer top tab having a center line, the stabilizer top tab affixed to the leg of the wheelbarrow at a second location on the leg spaced-apart from the first location;
   a stabilizer upright portion extending from the stabilizer bottom portion; and
   a stabilizer top portion coupling the stabilizer top tab and the stabilizer upright portion;
   wherein the stabilizer top tab is angled relative to the stabilizer top portion thereby defining a stabilizer upper exterior angle, the stabilizer top portion is angled relative to the stabilizer upright portion thereby defining a stabilizer middle interior angle, and the stabilizer upright portion is angled relative to the stabilizer bottom portion thereby defining a stabilizer bottom exterior angle; and wherein an intersection of the first location and the stabilizer bottom portion center line and an intersection of the second location and stabilizer top tab center line define a stabilizer offset distance, the stabilizer offset distance being larger than the stabilizer bottom portion width.

* * * * *